United States Patent
Tanigawa et al.

(10) Patent No.: US 6,263,664 B1
(45) Date of Patent: Jul. 24, 2001

(54) COMBINED STEAM AND GAS TURBINE ENGINE WITH MAGNETIC TRANSMISSION

(76) Inventors: Hiroyasu Tanigawa; Kazunaga Tanigawa, both of 428-35 Enami, Okayama-shi Okayama 702 (JP)

( * ) Notice: Subject to any disclaimer, the term of this patent is extended or adjusted under 35 U.S.C. 154(b) by 0 days.

(21) Appl. No.: 09/202,866

(22) PCT Filed: Jun. 27, 1997

(86) PCT No.: PCT/JP97/02250

§ 371 Date: Dec. 16, 1998

§ 102(e) Date: Dec. 16, 1998

(87) PCT Pub. No.: WO98/00628

PCT Pub. Date: Jan. 8, 1998

(30) Foreign Application Priority Data

Jun. 28, 1996 (JP) .................................................. 8-204049

(51) Int. Cl.⁷ .............................. F02C 3/073; F02C 3/107; F02C 3/30; F02C 6/00; F23R 3/42

(52) U.S. Cl. .......................... 60/39.54; 60/39.58; 60/730; 74/DIG. 4

(58) Field of Search ............................... 60/39.54, 39.58, 60/39.182, 730, 268; 74/DIG. 4

(56) References Cited

U.S. PATENT DOCUMENTS

| | | | | |
|---|---|---|---|---|
| 2,548,975 | * | 4/1951 | Hawthorne | 60/268 |
| 2,608,821 | * | 9/1952 | Hunsaker | 60/268 |
| 2,916,877 | * | 12/1959 | Walter | 60/730 |
| 2,929,207 | * | 3/1960 | Peterson | 60/268 |
| 3,224,195 | * | 12/1965 | Walsh | 60/39.58 |
| 3,301,091 | * | 1/1967 | Reese | 74/DIG. 4 |
| 3,335,565 | * | 8/1967 | Aguet | 60/39.182 |
| 3,751,906 | * | 8/1973 | Leas et al. | 60/39.182 |
| 3,864,587 | * | 2/1975 | Landry | 74/DIG. 4 |
| 4,649,307 | * | 3/1987 | Bech | 74/DIG. 4 |
| 5,013,949 | * | 5/1991 | Mabe, Jr. | 74/DIG. 4 |
| 5,170,622 | * | 12/1992 | Cheng | 60/39.54 |
| 5,569,967 | * | 10/1996 | Rode | 74/DIG. 4 |
| 5,717,266 | * | 2/1998 | Maynard, Jr. | 74/DIG. 4 |

FOREIGN PATENT DOCUMENTS

307293 * 2/1930 (GB) ...................................... 60/730

* cited by examiner

Primary Examiner—Ted Kim
(74) Attorney, Agent, or Firm—Flynn, Thiel, Boutell & Tanis, P.C.

(57) ABSTRACT

In a combined steam and gas turbine engine cycle, a combustion chamber is made durable against high pressure and enlarged in length to increase the operation pressure ratio, without exceeding the heat durability temperature of the system while increasing the fuel combustion gas mass flow four times as much as the conventional turbine system and simultaneously for greatly raising the thermal efficiency of the system and specific power of the combined steam and gas turbine engine.

Water pipes and steam pipes are arranged inside the combustion chamber so that the combustion chamber can function as a heat exchanger and thereby convert most of the combustion thermal energy into super-critical steam energy for driving a steam turbine and subsequently raising the operation pressure ratio and the thermal efficiencies of the steam turbine cycle and gas turbine cycle. The combustion gas mass flow can be also increased by four times as much as the conventional turbine system (up to the theoretical air to fuel ratio) and the thermal efficiency and the specific power of the gas turbine cycle are considerably increased.

Further, the thermal efficiency of the combined system is improved by installing a magnetic friction power transmission system to transmit the power of the system to outer loads.

15 Claims, 18 Drawing Sheets

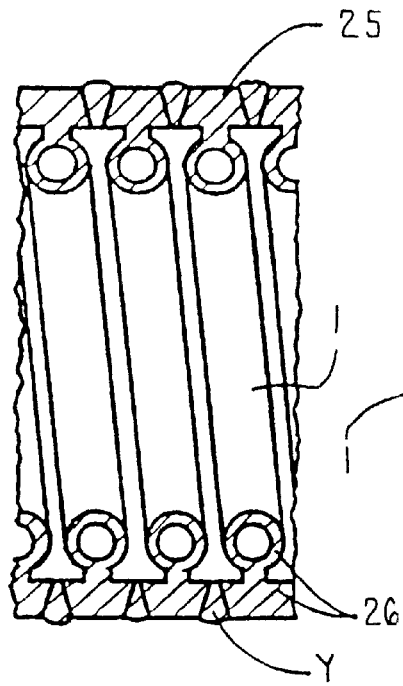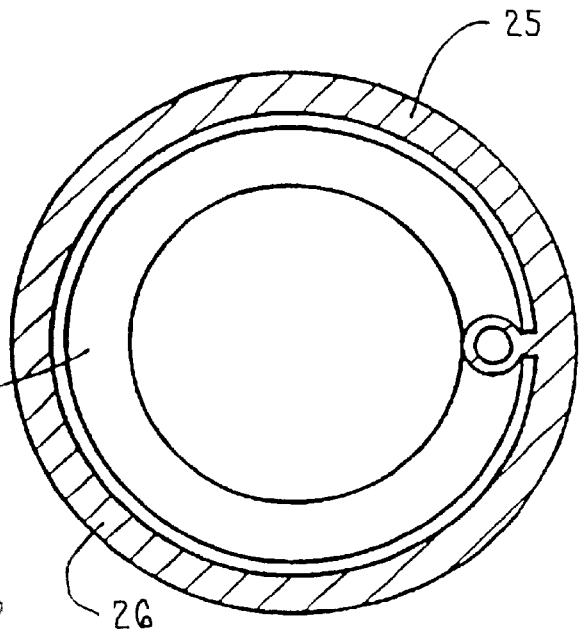
FIG. 5(a)
FIG. 5(b)
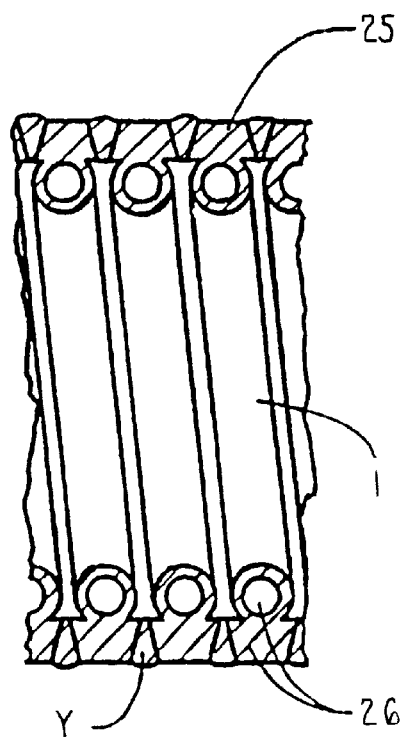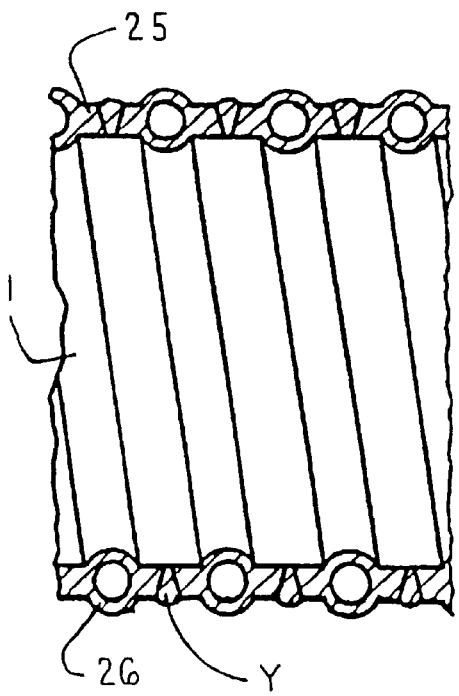
FIG. 5(c)
FIG. 5(d)

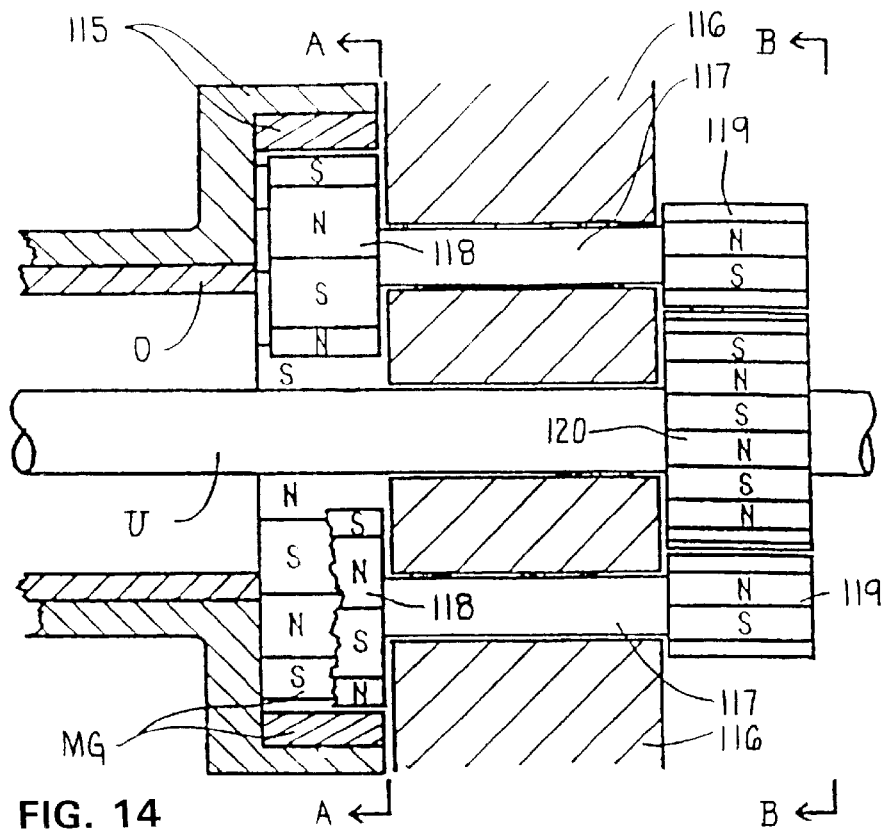
FIG. 14
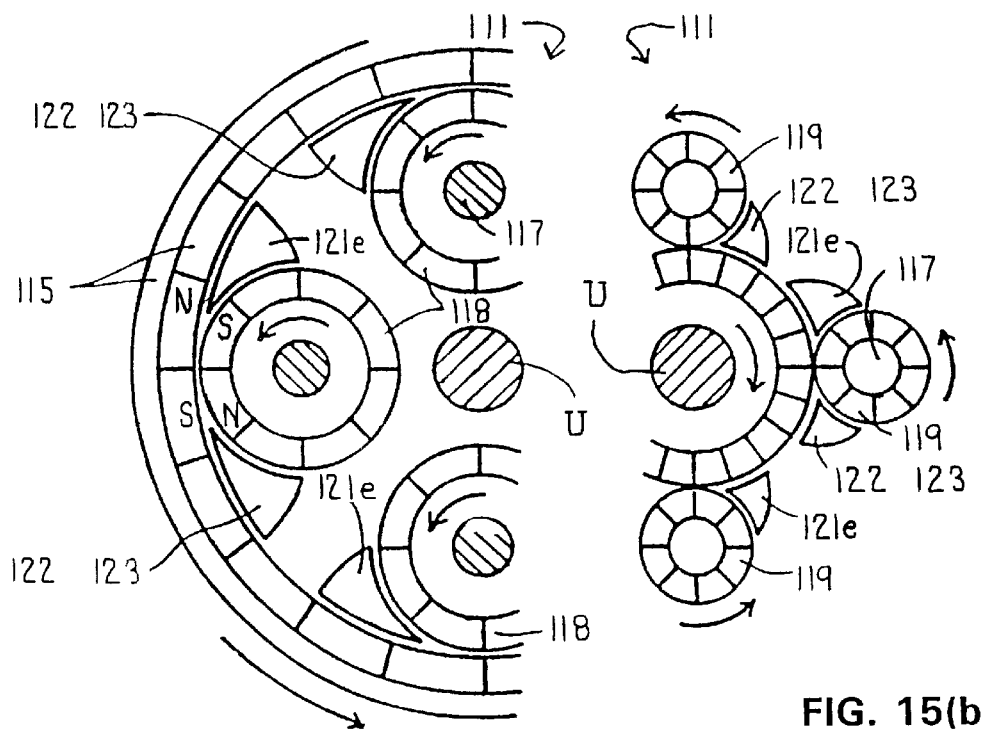
FIG. 15(b)
FIG. 15(a)

COMBINED STEAM AND GAS TURBINE ENGINE WITH MAGNETIC TRANSMISSION

This application is the national stage of International Application PCT/JP97/02250 filed Jun. 27, 1997.

FIELD OF THE INVENTION

The invention relates to a combined steam and gas turbine engine. More particularly, to a gas turbine engine combustion chamber having a helical welded structure heat exchanger on an outside surface thereof for cooling the combustion chamber with water and thereby raise the combustion gas pressure higher than a conventional turbine combustion chamber and further enlarge the dimensions of the combustion chamber for increasing the fuel supply means three times as much. Further, the invention relates to a combined steam and gas turbine engine in which inside of the combustion chamber, a steam heater is disposed and the combustion gas drives a gas turbine and the steam drives a steam turbine. The invention also relates to a combined steam and gas turbine system having a magnetic friction power transmission system which allows an internal axis and an outside axis to rotate in an opposite direction at a predetermined ratio and the power is transmitted through the internal axis or the outside axis to loads.

PRIOR ARTS

A combined steam and gas turbine engine is disclosed in Japanese Patent Laid Open Sho 50-89737, in which a supercritical heat exchanger or a heat recovery system is disposed inside the high temperature area of the gas turbine combustion chamber, thereby raising the temperature of the steam temperature of the steam turbine cycle and consequently increasing the efficiency of the combined system.

Japanese Laid Open Sho 52-186248 discloses a system in which an exhaust gas of the gas turbine is recovered and utilized as a heat source for a steam boiler, thereby reducing the temperature of the exhaust gas and raising the thermal efficiency of the system.

These prior arts were intended to increase the thermal efficiency of the super-critical steam boiler cycle and not increase the gas pressure and specific power ratio spontaneously or increase the thermal efficiency of the gas turbine engine.

The inventors of this application filed several patent applications for the improved gas turbine engines as Japanese Patent applications Hei6-330862, Hei7-145074, Hei7-335595, Hei8-41998, Hei8-80407, Hei8-143391, Hei8-204049, and Hei8-272806.

Basic factors of the Brayton cycle engine, for instance a turbine engine, are the thermal efficiency (operating pressure ratio) and the specific power. The higher the thermal efficiency, the higher the specific power ratio. Therefore, if the thermal efficiency is constant, the output power is dependent on the heat supplied to the system. The operating pressure ratio and the specific power are limited by the heat durability of the turbine system. To maximize the operating pressure ratio and the heat supplied to the system within the heat durability of the system, most of the heat supplied to the system should be converted to super-critical steam which is utilized in the other systems, such as the steam turbine engine, thereby increasing the value of "thermal efficiency"×"specific power"="operating pressure ratio"× "combustion gas mass flow".

A burden for increasing the operating pressure ratio and the specific power is that the heat durability temperature limits the full use of the thermal energy generated from the fuel. The inventor of this application discovered an effective use of the thermal energy of the fuel. The objective of this invention is to increase the thermal efficiency and the specific power of the system by reducing part of the heat generated from the fuel utilized by the gas turbine engine. The combined steam and gas turbine engine of this application comprises a gas turbine combustion chamber which has a long dimension and wide heat exchange area used as a heat exchanger, and the thermal energy generated from the fuel is converted to super-critical steam, which is used in other systems to increase the operating pressure ratio and the specific power within the heat durability temperature of the system. For instance, the fuel gas mass is increased four times as much as the theoretical air to fuel ratio.

A gas turbine combustion chamber having a long dimension and operating at a high pressure condition, also works as a heat exchanger having a wide heat exchange area, thereby the thermal efficiency of the system increases as the operating pressure ratio becomes high and a further high temperature is obtained from the thermal energy generated from the same amount of fuel as the operating pressure ratio is high.

When the inlet gas temperature of the gas turbine engine is about 700° C. to 1000° C., the heat exchange rate becomes high. Therefore, the area for the heat exchange may be decreased, and the thermal efficiency becomes high because the exhaust heat loss becomes low. The combined steam and gas turbine engine of this invention utilizes the thermal energy of the fuel at its maximum rate.

The objective of this invention is to provide a combined steam and gas turbine engine applicable to a variety of fields.

The other objective of this invention is to provide a magnetic friction power transmission system for decreasing the energy losses, and to provide a turbine engine with full dynamic turbine blades for decreasing the thermal energy loss.

A further objective of this invention is to provide a power generating system having a plurality of power units and batteries.

DISCLOSURE OF THE INVENTION

A combined steam and gas engine will now be explained.

A combustion gas as a working gas of the gas turbine engine, in general, contains a large amount of air, four times as much as the theoretical air to fuel ratio. the dimensions of the gas turbine combustion chamber will be long enough to provide the fuel supply means four times as much as a conventional one.

The combustion chamber has a helical welded structure heat exchanger outside surface thereof for cooling the combustion chamber with water and raising the combustion gas pressure higher than the conventional turbine and further enlarging the dimensions of the heat exchange area of the heat exchanger.

A helical water cooling pipe and a steam pipe are located inside the combustion chamber of the gas turbine, and the pipes are welded to the surface of the combustion chamber to operate at high pressure.

As the inlet gas temperature of the gas turbine engine is lowered under the heat durability temperature of the system by the cooling system described above, the compressed air contains a theoretical ratio of the fuel and air, so that the fuel mass will be increased 4 times as much as a conventional system.

A steam turbine engine operating at a high temperature and pressure may be added to the system so that the combustion may be conducted at theoretical combustion conditions. The gas turbine engine and a steam turbine engine are combined so that the thermal efficiency of the system may become 60 to 80%.

BRIEF EXPLANATION OF THE DRAWINGS

FIGS. 5(a) to 5(d) are a sectional view of the combustion chamber showing the welded structure of the heat exchanger.

FIG. 14 is a partial sectional view of a magnetic friction power transmission system.

FIG. 15 is a sectional view of line A—A, and B—B in FIG. 14.

FIG. 24 is a sectional view of a transmission system having a bevel magnetic friction wheel 125a.

DESCRIPTION OF THE REFERENCE NUMERALS

1: water pipe, 2: water pump, 3: water supply, 4: combustion chamber and heat exchanger, 5: steam, 6: steam pipe, 7: steam valve, 8: return water, 9: return water pump, 10: combustion gas, 11: recovery heat exchanger, 12: waste-incinerating furnace, 13: heat exchanger for waste incinerating furnace, 14: magnetic friction power transmission system, 15: air induction chamber, 16: outer compressor turbine blades, 17: inner compressor turbine blades, 18: exhaust gas chamber, 19: outer turbine dynamic blades, 20: inner turbine dynamic turbine blades, 21: circular outlet, 22: circular receptor, 23: circular receptor, 24: circular jet nozzles, 25: outer shell of the combustion chamber, 26: water cooling wall, 27: fuel supply means, 111: magnetized wheel, 112: magnetized friction wheel, 115: first main magnetized wheel, 116: main turbine engine, 117: support axle, 118: first idle magnetized wheel, 119: second magnetized wheel, 120: second idle magnetized wheel, 121: yoke, 122: antimagnetic body, 123: magnetic shield means, 124: first main magnetized wheel, 125: first idle magnetized wheel, 126: second main magnetized wheel, 127: second idle magnetized wheel, 128: friction enhancement means, 129: projections, 130: magnetized bevel wheel, 131: propulsion system for vehicle or boats, 132: thermal engine system, 133: electric motor, 134: magnetic friction power transmission system, 135: invertor, 136: dynamo-motor, 137: battery, 138: magnetized friction wheel, 139: materials absorbed by the magnets, 140: magnetic friction power transmission system, A: air, B: combustion chamber, C: compressor, D: exhaust heat, E: fuel, EX: exhaust gas, K: air and water separator, F: flange, I: condensed water, O: outer axle system, P: power transmission surface, Q: induced air, R: water recovery, S: static blades, U: inner axle system, W: cooling water, Y: welding, MC: full dynamic turbine blades, MGT: full dynamic turbine blade steam and gas turbine engine, MG: magnet, FL: outer frame, OS: oil cylinder, HG: transmission system, NG: input axle, SG: output axle, IMG: input magnetized friction wheel, OMG: output magnetized friction wheel, PL: plane having projections and cavities, HL: oblique projections, YL: projections, FC: friction enhancement means, YO: yoke, HP: high pressure steam turbine, MP: middle pressure steam turbine, LP: low pressure steam turbine, M: generator, ST: steam turbine engine, GT: gas turbine engine, HPA: high pressure air, SGT: combined steam and gas turbine engine, HS: hot water supply system.

BEST MODE OF THE INVENTION

The invention of this application is explained according to the attached drawings.

Figure 1:
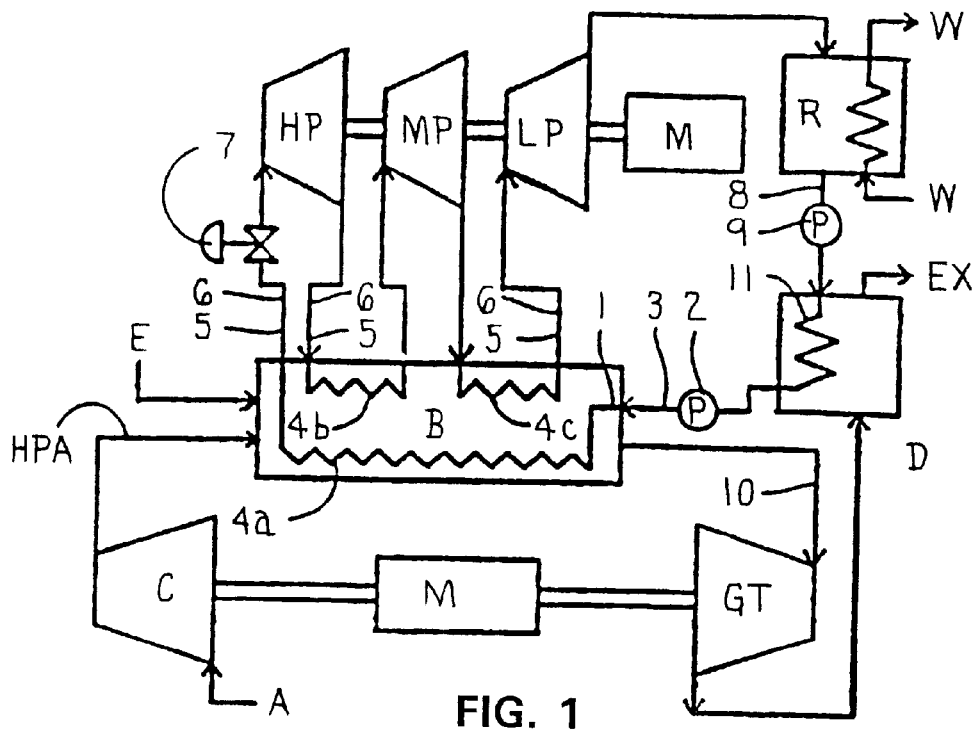
FIG. 1 is a basic schematic diagram of the first embodiment of the invention.

FIG. 1 shows a schematic diagram of the first embodiment of the invention for explaining a principle of this invention.

In FIG. 1, the system comprises a compressor, a long dimension combustion chamber in which high pressure combustion takes place, a gas turbine, steam turbines, and a power generator.

The thermal efficiency of the gas turbine is dependent on the operating temperature, however, there exists a limit to the operating temperature due to the system being destroyed due to the materials of the system failing.

To operate the system at its maximum thermal efficiency, the specific pressure must be raised, the velocity of the combustion gas must be at a high speed, and the combustion gas mass flow becomes larger, so the system is arranged as follows.

A water pipe 1 is helically welded around a combustion chamber B and the combustion chamber becomes a heat exchanger 4a that has a long dimension and high pressure combustion condition. Internal steam pipes 6,6 are also arranged helically in which the pressurized water 3 is supplied by a water pump 2. Heated water becomes critical steam 5 which is supplied to a high pressure steam turbine HP through a steam valve 7 to drive the turbine. The exhaust steam is returned to the combustion chamber and re-heated in the combustion heat exchanger 4b, the reheated steam drives a middle pressure steam turbine MP, returns to the combustion chamber, and again heated to drive low pressure steam turbine LP, and each steam turbine drives a power generator M.

The steam is condensed to water in a condenser R cooled by sea water, the condensed water 8 is pumped to a heat recovery means 11 by a pump 9 and cycled to the combustion chamber.

As illustrated in FIG. 9 to FIG. 12, a gas turbine cycle comprises oppositely arranged compressors and oppositely arranged turbines to make the combustion chamber have a longer dimension and a power generator, which is disposed in the middle of the turbines. Oppositely arranged compressors introduce air into the combustion chamber in which the air is mixed with the burning fuel to produce gases that drive a turbine where the fuel to air ratio is controlled to the theoretical ratio. The combustion gas temperature is controlled for the heat durability of the system at about 800° C. and the combustion gas mass flow is maintained at a high value. The combustion gas mass flow is increased by raising the operating pressure ratio and heat recovery through the heat exchangers.

The exhaust gas is introduced into a low temperature heat recovery heat exchanger 11 by which the exhaust heat loss is lowered and the thermal efficiency of the system is doubled. In the conventional combined turbine system, since all of the thermal energy generated from the fuel is used based on the heat durability temperature of the system, the operating pressure ratio and thermal energy is limited by the heat durability temperature limit, hence it is very difficult to increase the thermal efficiency and specific power of the system.

To maximize the operating pressure ratio and utilize the thermal energy of the fuel effectively under the temperature of heat durability of the system, according to the equation of "thermal efficiency"×"specific power"="operating pressure ratio"×"combustion gas mass flow", the thermal energy supplied to the turbine engine is minimized to the lowest, hence the thermal efficiency and the specific power is increased, especially, the thermal efficiency is doubled.

The combustion chamber of the gas turbine engine is an appropriate container for raising the operation pressure ratio, if heat exchangers 4 are disposed within the combustion chamber, a higher operation pressure is obtained from the same heat energy and further inlet gas temperature of the turbine engine ranges from about 700° C. to 1000° C., the heat exchange rate becomes high and it is possible to reduce the heat exchange area of the heat exchangers 4a, 4b, 4c.

The heat is effectively converted to super-critical steam and the thermal efficiency of the steam turbine engine also becomes high.

The thermal energy of the exhaust gas having a comparatively low thermal energy is again recovered through the heat recovery heat exchanger 11, the exhaust heat loss is recovered consequently and the total thermal efficiency of the system is increased.

Figure 2:
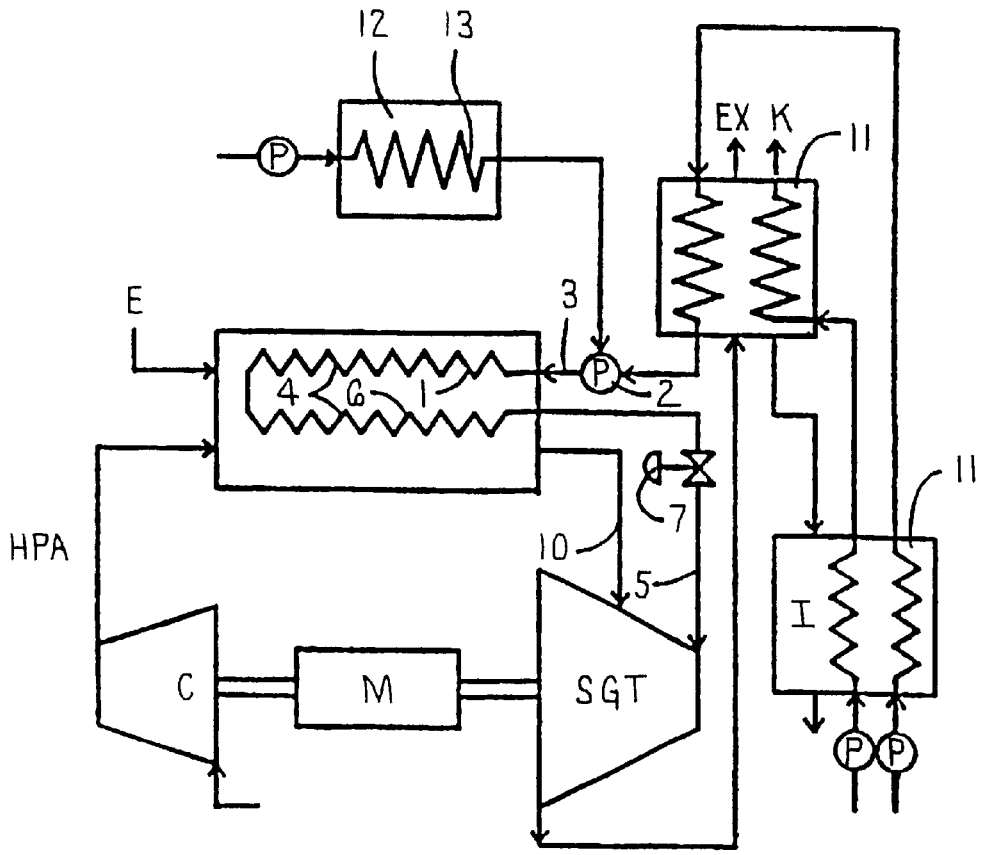
FIG. 2 is a schematic diagram of the second embodiment of the invention.

As illustrated in FIG. 2, super-critical steam is injected into the gas turbine, and the steam turbines are omitted from the system, the system becomes compact and the thermal efficiency will increase.

The invention is explained in more detail according to the embodiments and the drawings.

Figure 6:
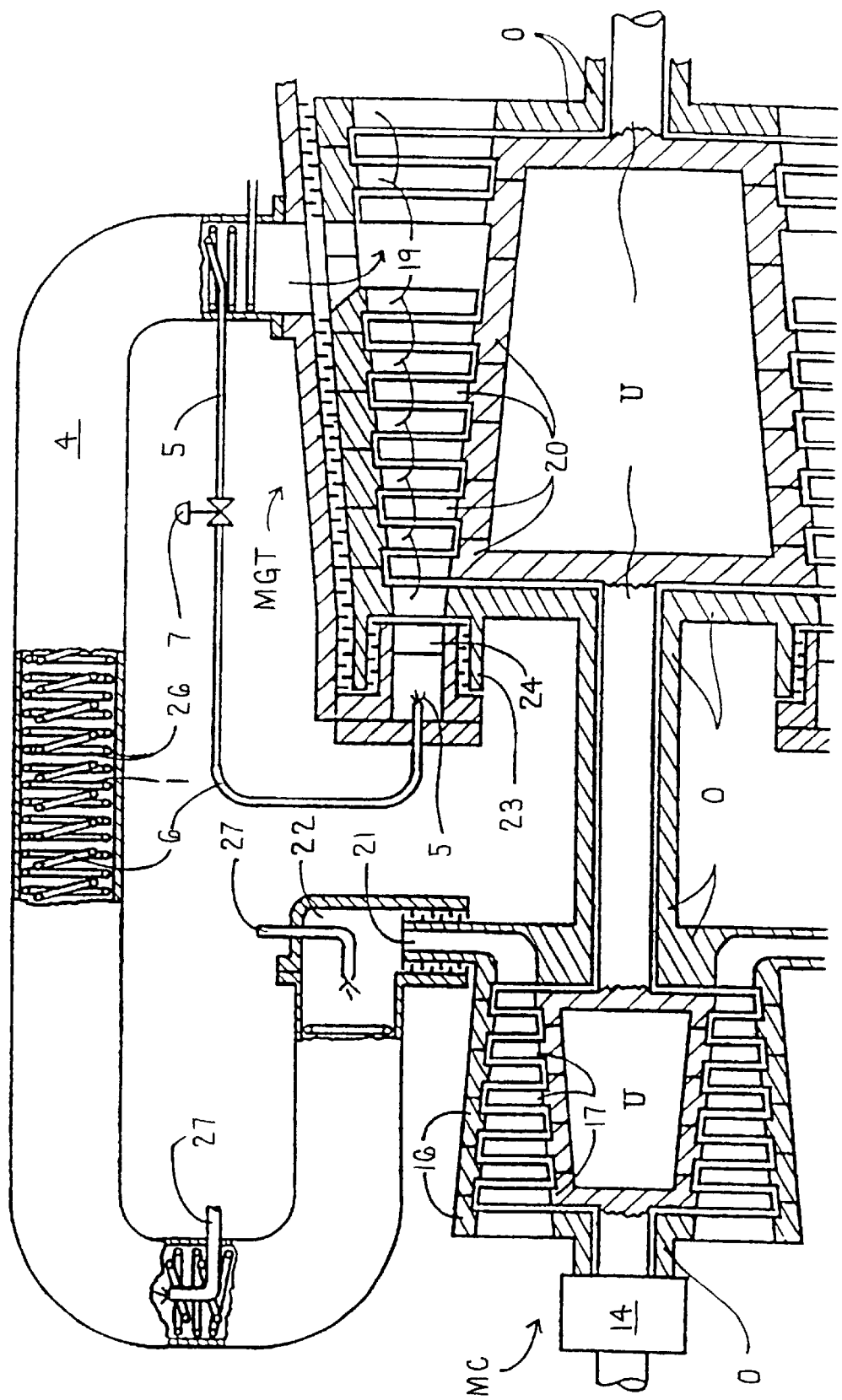
FIG. 6 is a partial sectional view of the first embodiment of the steam and gas combined turbine engine.

In the mono-axle compact combined steam and gas turbine engine of this invention as illustrated in FIG. 2, internal steam pipes 6,6 are arranged helically in which the pressurized water 3 is supplied by a water pump 2 to the heat exchanger 4 which has helical pipe water jacket which is welded as illustrated in FIG. 5 and FIG. 6 around the inside wall of the combustion chamber.

The pressurized water 3 catches the heat generated in the combustion chamber while passing through the water pipe 1, the heated water becomes critical steam 5, the water being separated from the critical steam 5 and supplied to the gas turbine SGT via valve 7 to drive a turbine engine with the combustion gas 10.

The combined steam and gas turbine cycle including the system having an oppositely arranged compressor and oppositely arranged gas turbine is illustrated in FIG. 6 to FIG. 12 and has a combustion chamber-heat exchanger system, provides a longer combustion chamber and higher pressure combustion condition, hence the thermal efficiency is increased. The combustion gas contains a lot of air, usually four times as much as the theoretical air and fuel ratio, and the specific heat of the air is lower than that of steam, the system of this invention increases the combustion gas mass flow so that the thermal efficiency of the system is increased.

The high efficiency combustion chamber-heat exchanger 4 working under the condition of a high temperature gradient drives the steam turbine engines effectively, and the total thermal efficiency of the system becomes high.

As illustrated in FIG. 1 and FIG. 2, the steam 5 drives the steam turbine engines or steam-gas turbine engine, and then is condensed to water in condenser (R) cooled by sea water. The condensed water 8 is pumped to a heat recovery means 11 by a pump 9 with pure water to obtain the thermal energy of the exhaust gas in the heat recovery means 11 and finally is cycled to the combustion chamber-heat exchanger 4.

The steam 5 generated in the combustion chamber 4 is dewatered and heated to a critical temperature, and is injected into the gas turbine, or the gas-steam turbine via the regulation valve 7 driving the turbine together with the combustion gas.

The compressed air from the air compressor is introduced into the combustion chamber 4 and mixed with the burning fuel to produce gases that drive a turbine, then high temperature combustion gases 10 expand and drive the gas turbine engine or the gas-steam turbine engine cooperating with the critical steam.

In the conventional gas turbine engine, there exists a limit to the operating temperatures dictated by the temperature at which the turbine blades and related system fail. If one tries to increase the thermal efficiency of the system by raising the operation pressure ratio, then the specific power decreases.

On the other hand, if one tries to increase the specific power of the system by raising the supplied thermal energy, then the operating pressure ratio decreases and the thermal efficiency also decreases.

As described above, it is very difficult to achieve the goal of increasing the thermal efficiency and the specific power under the condition of the operating temperature limit.

The inventor considers that a factor of "operating pressure ratio×supplied thermal energy" is modified as follows;

"thermal efficiency"×"specific power"="operating pressure ratio"× "combustion gas flow mass"="velocity"×"mass".

If the combustion gas flow mass is increased instead of the supplied thermal energy, it is convenient to adapt the combustion-heat exchanger 4, and the combustion gas flow mass (supplied thermal energy) is increased by four times, the specific power is also increased.

Further, since the total supplied thermal energy is decreased and the specific power increases, the thermal efficiency of the gas turbine cycle is doubled.

Under the condition that the combustion thermal energy is constant, the thermal energy that can be supplied to the steam turbine engine or the gas-steam turbine engine through the combustion-heat exchanger 4 is dependent on the operating pressure ratio of the system. When the operating pressure ratio of the system is raised, the thermal efficiency of the steam turbine engine or the gas-steam turbine engine is effectively increased.

If the entrance temperature of the gas turbine is constant, the exhaust thermal energy from the gas turbine decreases.

The reversed compressors introduce the air into the combustion chamber in which the air is mixed with the burning fuel to produce gases that drive a turbine where the fuel to air ratio is controlled at the theoretical ratio. The combustion gas temperature is controlled to be under the heat durability temperature of the system, which is about 800° C., and the combustion gas mass flow is maintained at a high level value. The combustion gas mass flow is increased by raising the operating pressure ratio and the amount of the heat recovery by the heat exchangers.

The exhaust steam is returned to the combustion chamber and re-heated in the combustion heat exchanger 4b, the re-heated steam drives a middle pressure steam turbine MP and then returns to the combustion chamber, heated again to drive the low pressure steam turbine LP, and each steam turbine drives a power generator M.

The steam is condensed to water in condenser R cooled by sea water, the condensed water 8 is pumped to a heat recovery means 11 by a pump 9 and cycled to the combustion chamber.

When the entrance gas temperature of the gas turbine engine is maintained constant and the operation pressure ratio or the combustion gas mass flow is increased, the total thermal energy of working fluid of the gas turbine engine or the thermal energy per unit mass of the working fluid decreases, consequently the thermal energy exhausted from the system and the thermal energy exhausted from the heat recovery heat exchanger are decreased. As the heat loss by exhausting the combustion gas containing a certain amount of thermal energy is decreased, the thermal efficiency of the system is increased.

Since the system is provided with the combustion chamber-heat exchanger 4, the combustion gas mass flow of the system is increased by four times as much as the conventional gas turbine system, the specific power of the gas turbine engine is increased, the operation pressure ratio of the gas turbine engine is increased, and the thermal efficiency of the gas turbine cycle and the steam turbine cycle is considerably increased, more particularly the thermal efficiency of the gas turbine engine is doubled and so a goal of the maximum thermal efficiency of the combined steam and gas turbine engine of this invention is about 60%.

The stator vanes of a compressor or turbine engine cause a great amount of energy losses in the system, so the system of the invention of this application omits the stator vanes and the stator vane-less system is provided with a magnetic friction power transmission system which increases the total thermal efficiency of the system as the magnetic friction power transmission system decreases the energy loss.

The maximum thermal efficiency of the system provided with the magnetic friction power transmission system is about 80%.

Figure 3:
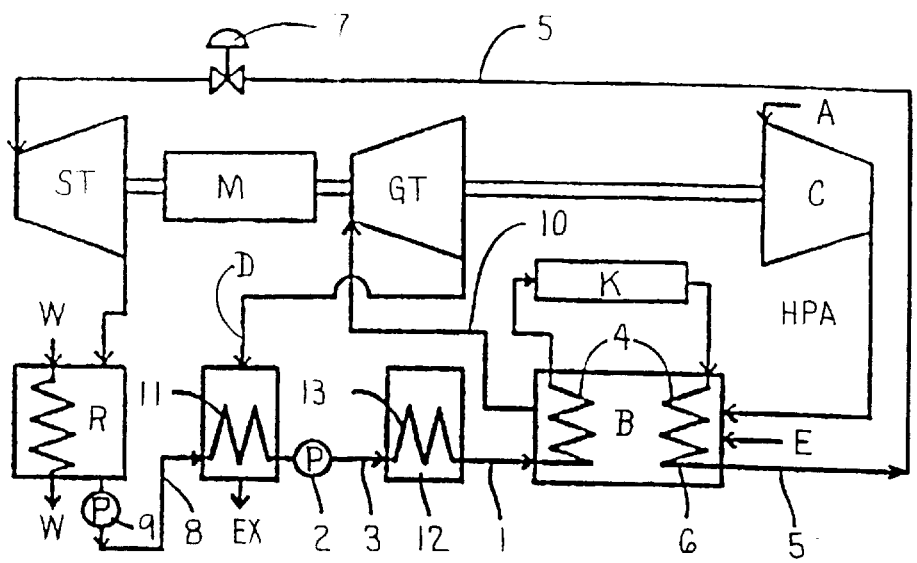
FIG. 3 is a schematic diagram of the third embodiment of the invention.

FIG. 3 shows a third embodiment of this invention in which a mono-axle combined steam and gas turbine engine will be explained.

The difference between the second embodiment is that the steam turbine and the gas turbine are arranged independently and a waste combustion furnace 13 is disposed after the heat recovery heat exchanger 11.

Since the system is provided with a combustion chamber-heat exchanger 4, the combustion gas mass flow of the system is increased by four times as much as the conventional gas turbine system and the specific power of the gas turbine engine is increased. Further, the operation pressure ratio of the gas turbine engine is increased, but does not exceed the durability temperature of the system, and the thermal efficiency of the gas turbine cycle and the steam turbine cycle is considerably increased.

Since the specific power and the thermal efficiency are dependent on the operation pressure ratio, and the operation pressure ratio is increased by the use of the combustion chamber-heat exchanger 4, the thermal efficiency of both the gas turbine engine and the steam turbine engine increase. Also, the combustion gas mass flow increases by four times as much.

When the inlet gas temperature of the gas turbine engine is maintained constant, the thermal energy per unit of combustion gas is lowered as the operation pressure ratio is increased. Therefore, the thermal energy exhausted from the gas turbine decreases and the exhaust gas temperature from the heat recovery heat exchanger 11 becomes low enough so as to decrease the heat loss of the system.

In this embodiment, the gas turbine is driven by the combustion gas mass flow and the thermal energy produced by the combustion of the fuel is consumed by the steam turbine for generating the steam to drive the steam turbine, so the flow rate of the steam turbine is comparatively large. The temperature of the supplied water 3 is rather low and heated by the thermal energy generated by the waste combustion furnace 13, and the heated water is further heated in the combustion chamber 4, hence, the thermal efficiency of the system is improved.

Figure 4:
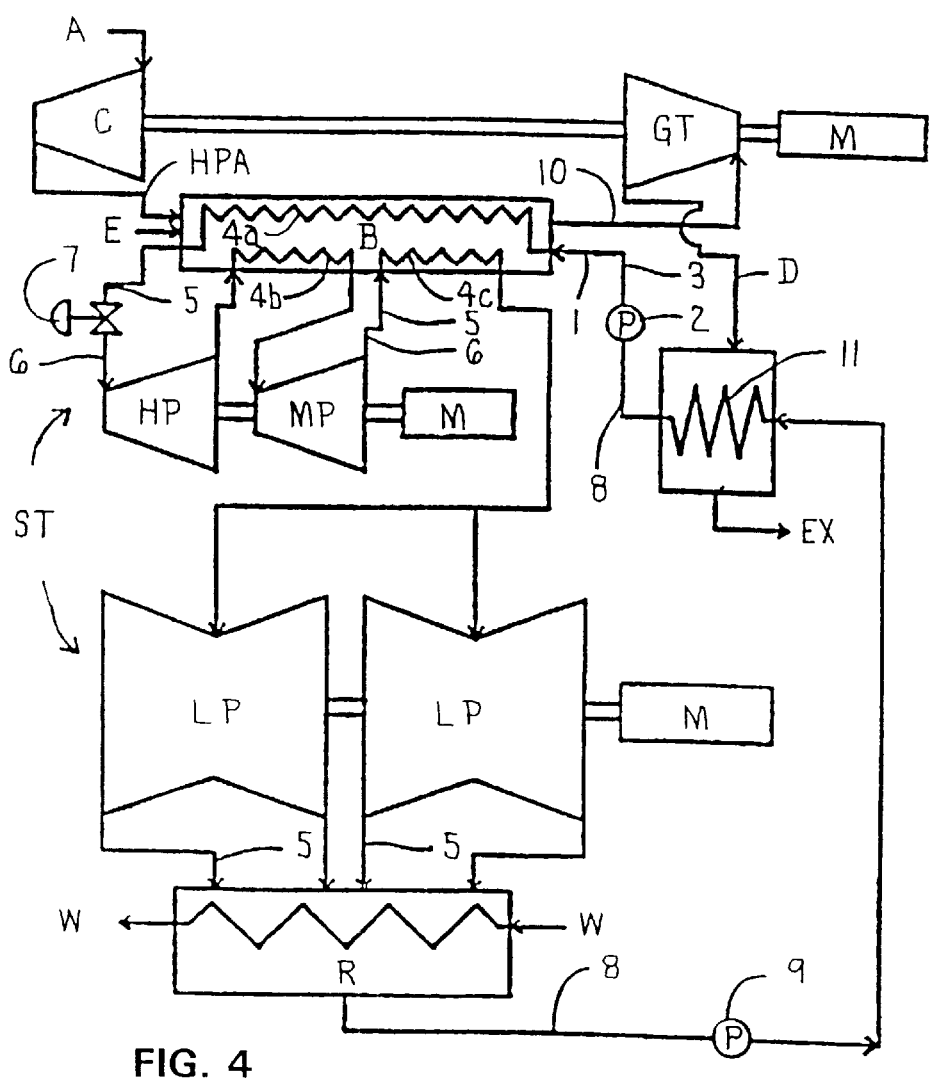
FIG. 4 is a schematic diagram of the fourth embodiment of the invention.

FIG. 4 shows a fourth embodiment of this invention in which a three-axle combined steam and gas turbines engine will be explained.

The difference between the aforementioned embodiments is that the revolution speed of each axle is determined independently to obtain a suitable revolution number of each axle.

For instance, for the gas turbine, the revolution speed is 9000/3000 rpm, for the high and middle pressure steam turbines, 3000 rpm, and for the low-pressure steam turbine, 1500 rpm. Or, the revolution speed is 750 rpm for the pair of full rotor blade steam turbine engines rotating in the opposite direction.

An aim of installing the three-axle turbine system is that since the specific volume of the low pressure-steam turbine increases, the revolution speed of the low-pressure steam turbine is lowered to the extent of 1500 rpm, and the radius of the steam pipe is doubled, so that the steam conduit passage section area becomes four times as large. The revolution speed of the full rotor blade low-pressure steam turbine rotating in the opposite direction is reduced to a quarter of that of the gas turbine, which is 750 rpm, the steam conduit passage section area is increased to 16 times as much. If the revolution speed of the full rotor blade steam turbine is reduced to half of that of the gas turbine, which is 1500 rpm, the steam conduit passage section area is increased to four times as much. Therefore, the outlet pressure of the steam turbine becomes close to a vacuum and consequently the operation pressure ratio becomes high, and the energy of the low pressure steam is ultimately converted to kinetic energy. The full rotor blade low-pressure-turbine has no stator blade that causes a kinetic energy loss so the thermal efficiency of the system is greatly improved.

It is necessary to increase the heat exchange area of the combustion chamber-heat exchanger 4 that produces super-critical steam, and to provide the combustion chamber with a high-pressure durable container for high-pressure operation. Then, the operation pressure ratio is increased and the combustion gas mass flow is increased by four times as much as the conventional turbines.

The structure of the combustion chamber is such that the helical water conduit pipe is welded around the combustion chamber as shown in FIG. 5(*a*), (*b*), (*c*) and (*d*).

More specifically, as shown in FIG. 5(*a*) and (*b*), at the outer surface of the helical water pipe 1, a T-shape outer wall 25 is disposed having at least one helical pipe is welded to another longitudinally to form a combustion chamber. Hence, the heat-exchange area of the combustion chamber is considerably increased.

As shown in FIG. 5(*c*), at least one helical pipe having an outer wall 25 is welded to form a combustion chamber. As shown in FIG. 5(*d*), a helical pipe 1 having a outer projections 25 at both sides is welded to form a combustion chamber.

FIG. 6 shows a compact or super compact full rotor blade combined steam and gas turbine. A combustion chamber 4 has structures shown in FIG. 5 and is a high-pressure resistant container. As shown in FIG. 6, the combustion chamber 4 is curved to form a long dimension combustion chamber and heat-exchange area and a plurality of fuel supply means 27, for example four times as much as the conventional turbine system, are disposed along the length of the combustion chamber 4. Super-critical steam 5 generated in the combustion chamber 4 is supplied to an uppermost upstream inlet of the steam-gas turbine engine and the combustion gas is supplied to the steam-gas turbine engine at an appropriate gas inlet disposed at the middle of the steam-gas turbine for driving the turbine.

As stated before, the stator rotors cause energy losses in the system, so I have omitted the stator rotors in my invention to increase the thermal efficiency of the turbine system. In FIG. 6, all the stator vanes of the conventional turbine system are replaced by the rotor blades to form outer compressor rotor blades 16 and outer turbine rotor blades 19.

They are coupled with the inner compressor rotor blades 17 and inner turbine rotor blades 20 respectively and rotate in the opposite direction to each other with the aid of the magnetic friction power transmission system. Therefore, the revolution speed of the blades is reduced to half that of a conventional system. Hence, the diameter of the blades can be extended to double the size of the conventional turbine system and a fluid passage section area can be designed to be four times as much as the conventional turbine system.

Now referring to FIG. 6, operation of the turbine system will be explained.

Air is introduced into the compressor through the first stage of the outer compressor rotor blades 16. Like a conventional turbine system, the air is compressed by the cooperating work of an odd number inner compressor rotor blade and an even number outer compressor rotor blade and is supplied to the combustion chamber-heat exchanger 4. The compressed air is mixed with fuel injected into the combustion chamber 4 through the plurality of fuel supply means 27 of which the amount is four times as much as the conventional turbine system. Combustion gas is injected into the steam-gas turbine through the appropriate stage of the rotor blades for driving the steam-gas turbine.

Most of the thermal energy generated in the combustion chamber 4 is converted into super-critical steam 5, the heat exchanged through the helical pipe 1 disposed around the combustion chamber 4, the steam injected into the steam-gas turbine from the most upstream annular inlet 24 via steam pipe 6 and regulating valve 7 and the combustion gas generated in the combustion chamber and the steam are mixed while driving the rotor blades 19 of the steam-gas turbine. As most of the thermal energy generated in the combustion chamber is converted to critical steam, the combustion gas temperature becomes low, therefore, the inlet gas temperature is lower than in the conventional system and never exceeds the durability temperature of the turbine system and the obtained kinetic energy drives loads, including a power generator.

An outer axle (o) having a last stage outer compressor rotor blade 16 and other rotor blades, and a first stage outer turbine rotor blade 19 and other rotor blades 19, is rotatably mounted on an inner axle (U) having a second stage inner compressor rotor blade, fourth rotor blade and so forth, and a second inner turbine rotor blade 20 and so forth. The outer axle and the inner axle are coupled by the magnetic bearing system and are rotated in the opposite direction.

The compressed air supplied from the outlet 21 of the compressor into the combustion chamber through an inlet 22 is mixed with the burning fuel from the fuel supply means 27, 27 and burnt in the combustion chamber. The combustion gas temperature is controlled by the amount of fuel supplied to the combustion chamber and by cooling the combustion chamber with the heat exchanger having the cooling wall 26 through which the cooling water is supplied, thereby increasing the number of fuel supply means for increasing the fuel and thermal energy generated in the combustion chamber, which may be four times as much as in a conventional system. (16/25)

Most of the increased thermal energy generated by the supplied fuel is converted to critical steam 5 which is supplied to the turbine through the inlet 23 via steam pipe 6 and the regulation valve 7. The critical steam 5 is then injected against the first stage outer turbine rotor blades 19 through the annular injection inlet and drives the rotor blades while flowing down to the outlet. On the other hand, combustion gas generated in the combustion chamber 4 is introduced into the turbine through the appropriate stage outer turbine rotor blade and mixed with the critical steam in the turbine while heating the steam.

Figure 7:
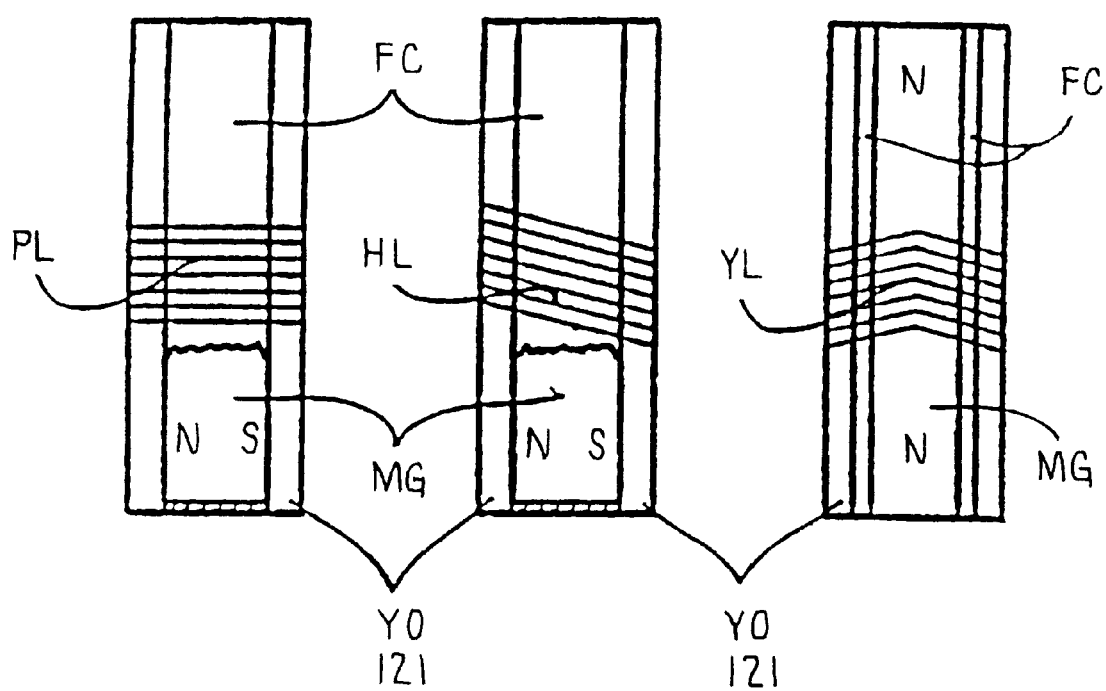
FIG. 7 indicates the principal idea of a magnetic friction power transmission system.
Figure 8A:
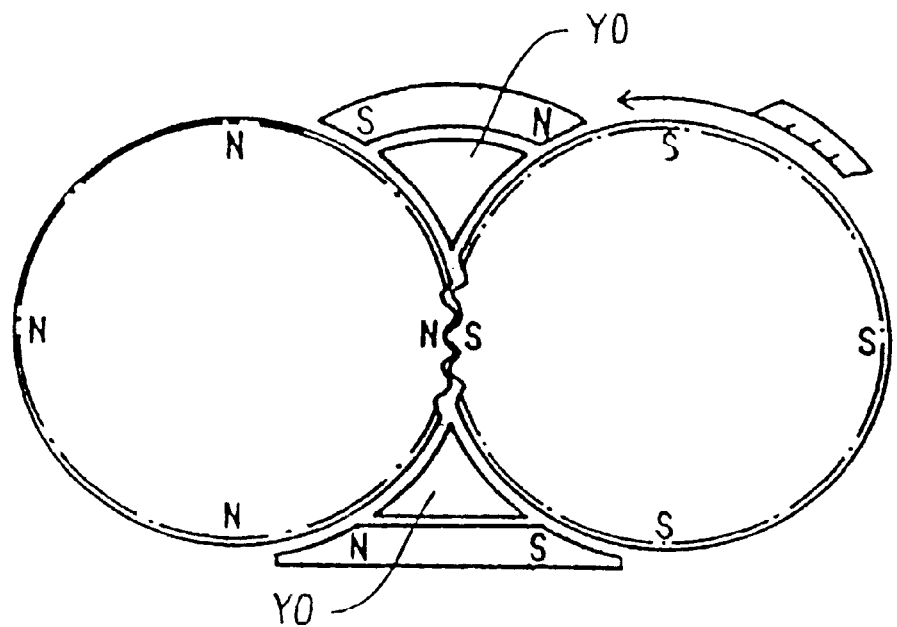
FIGS. 8(a) and 8(b) are a sectional view of a magnetic friction power transmission system used in the invention.

FIG. 7 and FIG. 8 show a magnetic friction power transmission system of this invention. In general, the revolution power is usually transmitted by a transmission consisting of gears when transmitting or reversing the direction of revolution. The conventional transmission system requires a lubricant and high strength material bearing the power that is transmitted and further there is a big drawback of a high-energy loss because of the high friction loss. Hence, the conventional gear transmission system is not suitable for large power transmission.

To realize a commercial full rotor blade combined steam and gas turbine engine, a high-speed, high-power and lubricant-less transmission system is needed.

I have invented a magnetic friction power transmission system to solve the above mentioned problems in which the gear engagement height is almost zero, the power is transmitted by rolling contact of the gears and high magnetic strength materials are used.

In the magnetic friction power transmission system, as the materials of the system are highly magnetized and utilize an attractive force of the magnet, the gear engagement height becomes almost zero, the power is transmitted with rolling contact of the gears, therefore the friction loss is almost zero and a water coolant can be used instead of the lubricant.

The magnetic friction power transmission system comprises magnetized friction wheels or magnetic friction wheels, as the conventional transmission system comprises gears. As to a power transmission mechanism, gears are replaced by friction wheels, helical gears are replaced by helical projection friction wheels, herringbone gears are replaced by herringbone projection wheels and bevel gears are replaced by bevel friction wheels.

In the magnetic friction power transmission system, since the opposite magnetic poles attract and the same poles rebel each other, opposite pole magnets are disposed in the revolution direction and the same pole magnets are disposed in the reverse revolution direction.

Figure 8B:
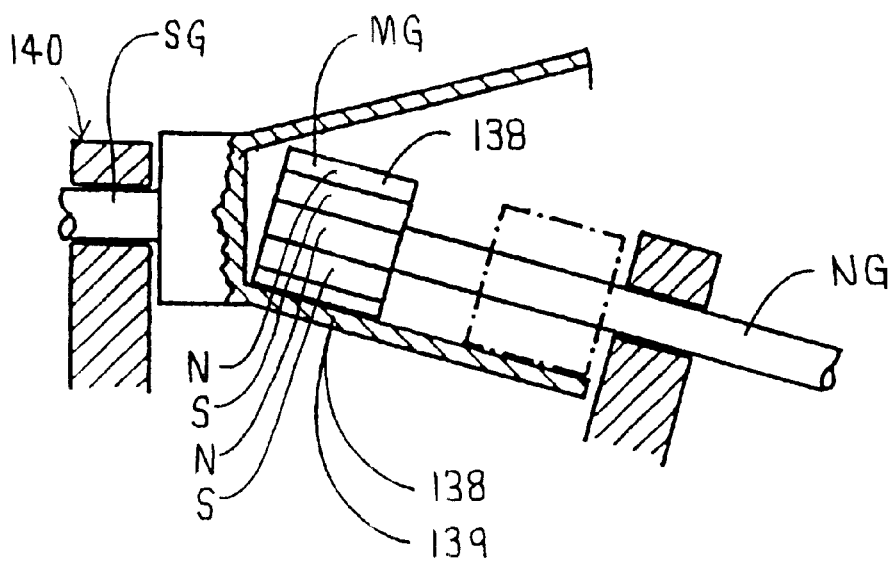

As shown in FIG. 8(b), the magnetic friction continuously variable transmission comprises a magnetized wheel which has a conically shaped hollow section made of magnetic attractive material and inside the hollow section wall is provided an elastic member to increase the friction force and is rotatably supported. An input axle having magnets at its top end is disposed inside the conical hollow section and attracts the one side of the hollow section wall. The input axle moves back and forth and changes the position where it contacts the conical hollow section of the output axle, consequently the power is changeably transmitted from the input axle to the output axle.

A double reverse magnetic power transmission system will be explained referring to FIG. 14 and FIG. 15.

A double reverse magnetic power transmission system comprises a magnetized wheel around which N-pole and S-pole magnets are arranged alternatively.

As the first main magnetized wheel 115 mounted inside of the outer axle rotates, rotational power is transmitted to an axle 117 mounted at the main turbine body 116 through N-S poles magnet alternatively arranged wheels 118. Then, second main magnetized wheels disposed at the other end of the axle 117 start to revolve. The opposite direction revolution power of the outer axle and the inner axle are added through the following axle 120.

The attraction and repulsion forces of the permanent magnet are dependent on the magnetic power of the magnet and the N and S poles are disposed alternatively around the magnetic wheel but the number of poles which is utilized effectively for the power transmission is small and a magnetic torque power increasing means is needed.

The easiest way to increase this power is to dispose yokes 121e, which magnetically increase the revolution power, at the revolution upstream position and antimagnetic bodies 122 or a magnet insulation element 123 at the revolution downstream position. The yoke 121e may be installed at both sides of the revolution upstream and downstream portions of the magnetic wheel.

Figure 16:
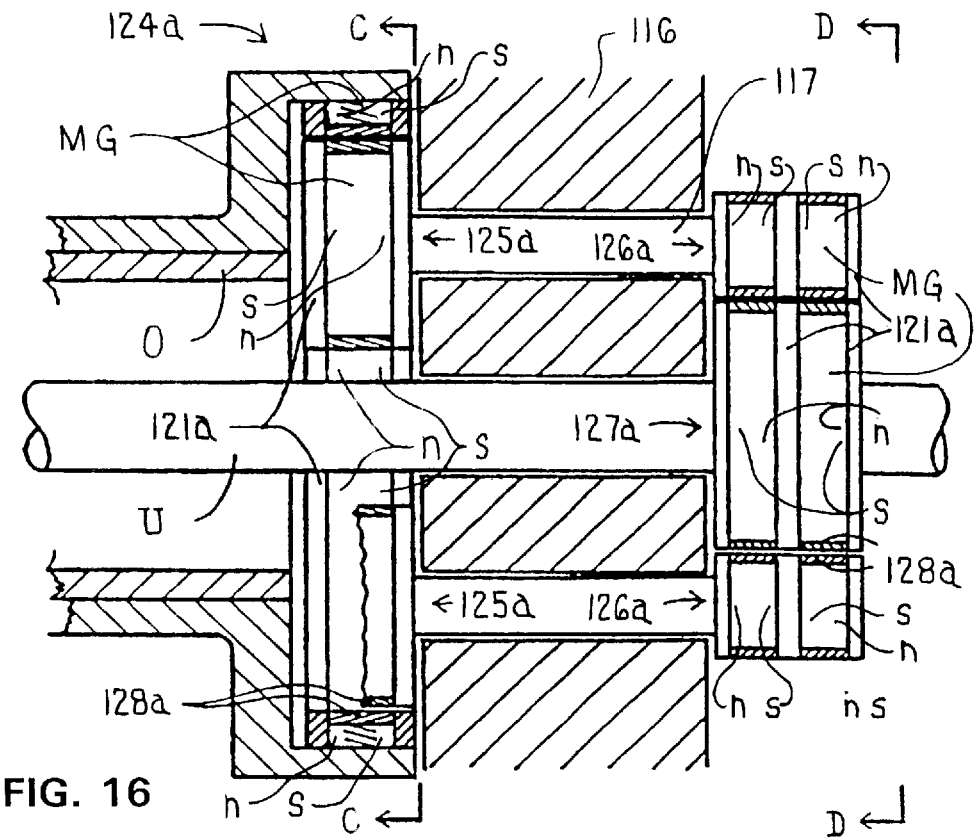
FIG. 16 is a partial sectional view of a magnetic friction power transmission system.
Figures 17A, 17B:
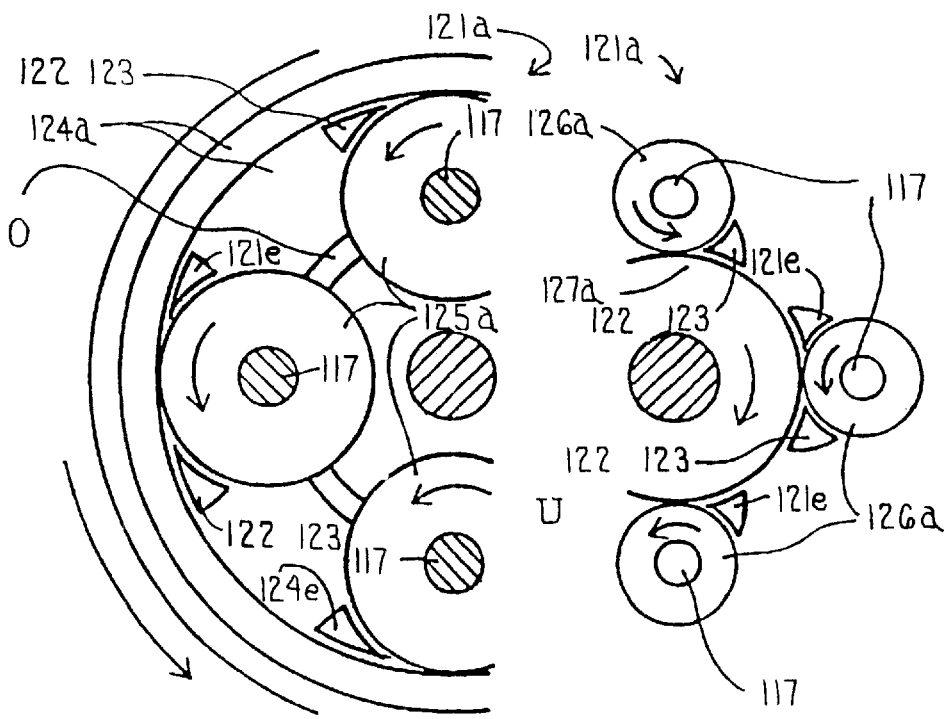
FIG. 17 is a sectional view of line C—C, and B—B in FIG. 16.

Another embodiment of the double reverse magnetic power transmission system will be explained referring to FIG. 16 and FIG. 17.

A double reverse magnetic power transmission system comprises a magnetized wheel around which N-pole and S-pole magnets are arranged alternatively, yokes around the magnetized wheels and magnetic friction increasing means and projections.

As the first main magnetized wheel 124a mounted inside of the outer axle rotates, the rotational power is transmitted to an axle 117 mounted at the main turbine body 116 through N-S poles magnet alternatively arranged wheels 125a. Then, second main magnetized wheels 126a disposed at the other end of the axle 117 start to revolve. The opposite direction revolution power of the outer axle and the inner axle are added through the following axle 127a.

The attraction and repulsion force of the permanent magnet is dependent on the magnetic power of the magnet and yokes 121a, 121e strengthen the damping force and the righting force becomes large but the sliding force is very weak. Projections 129 for increasing the friction and a friction increasing means 128a and a water cooling means are provided in the magnetic friction power transmission system.

Figures 18A, 18B:
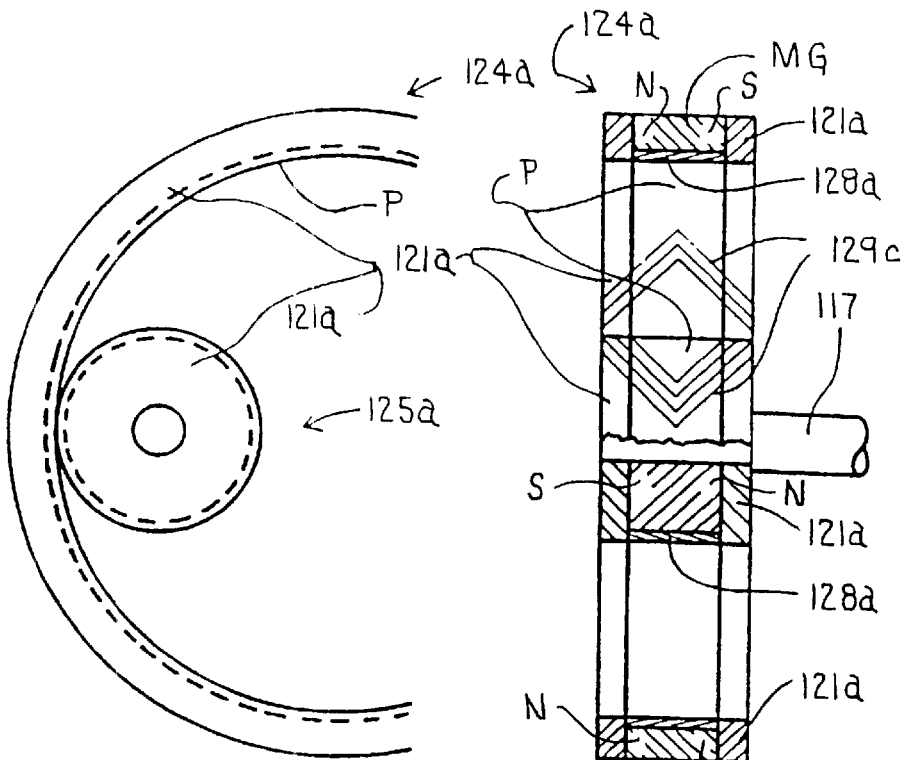
FIG. 18 is an embodiment of the magnetic friction power transmission system.

A magnetic part of the first main internal magnetized wheel 124a and first following magnetized wheel 125a of the magnetic power transmission system will be explained referring to FIG. 18.

The first main internal magnetized wheel 124a comprises a cylinder consisting of ferromagnetic material which has N-pole and S-pole magnets at both sides of the wheel and yokes 121a, 121a are disposed at both sides of the wheel. The friction increasing means 128a, which is annular shaped, is placed between the yokes 121a, 121a.

Projections 129 are disposed inside the yokes for acting like gears. (Explained later)

A first idle magnetized wheel having a magnetic N-pole and magnetic S-pole 125a is rotatably mounted on a ferromagnetic cylinder and supported by the yokes disposed on both sides of the ferromagnetic cylinder. The yokes extend in the radial direction to make an annular cavity where the friction increasing mean having a plurality of projections 129, like gear teeth, (for instance like herringbone gear teeth 129c) on a peripheral surface thereof is fixed.

Like a gear, the herringbone-like friction increasing mean slips when overloaded.

The revolution power is transmitted steadily to an axle 117 mounted at the center of the cylinder by the attraction and repulsion forces of alternatively arranged magnetic N-S poles.

The drawbacks of the sliding force towards the radius center will be cancelled by the friction increasing mean and projections 129. Further, the lubricant of the system can be replaced by the water coolant.

Figures 19A, 19B:
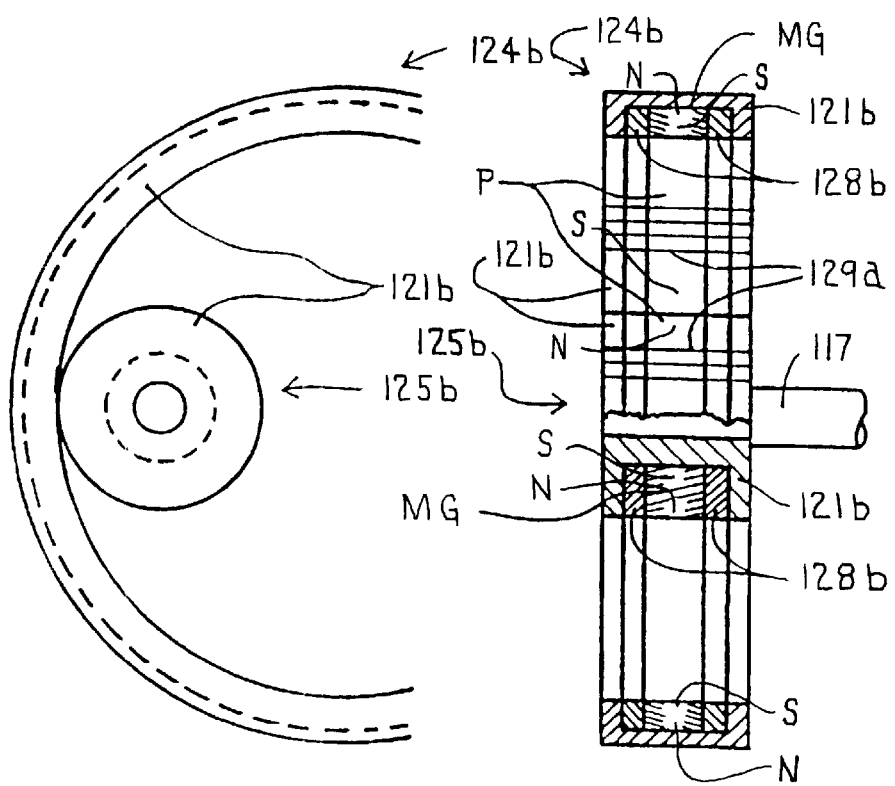
FIG. 19 is another embodiment of the magnetic friction power transmission system.

Another example of the first main internal magnetized wheel 124b and first following magnetized wheel 125b of the magnetic power transmission system will be explained referring to FIG. 19.

The first main internal magnetized wheel 124b comprises a cylinder consisting of ferromagnetic material, magnetic N-poles and S-poles arranged in the radial direction of the cylinder, annular yoke 121b extending radially at both sides concentrating the magnetic force line, friction increasing mean 128a disposed at the space between the yoke and magnet, and low height projections disposed at the circumference of the cylinder.

A first inner magnetic friction wheel 125b comprises a cylinder consisting of ferromagnetic material, magnetic N-poles and S-poles arranged in the radial direction of the cylinder, annular yoke 121b extending radially at both sides concentrating the magnetic force line, friction increasing mean 128b disposed at the space between the yoke and magnet, and low height projections disposed at the circumference of the cylinder. The first main internal magnetized wheel and the first inner magnetic friction wheel engage to transmit the revolution power and the engagement slips when overloaded.

The revolution power is transmitted steadily to an axle 117 mounted at the center of the cylinder by the attraction and repulsion forces of alternatively arranged magnetic N-S poles. The drawbacks of the sliding force toward the radius center will be cancelled by the friction increasing mean 128b and projections 129a. Further, the lubricant of the system can be replaced by the water coolant.

A power transmission mechanism of the second main internal magnetized friction wheel 126a and second following magnetized wheel 127a of the magnetic power transmission system will be explained referring to FIG. 20.

Figures 20A, 20B:
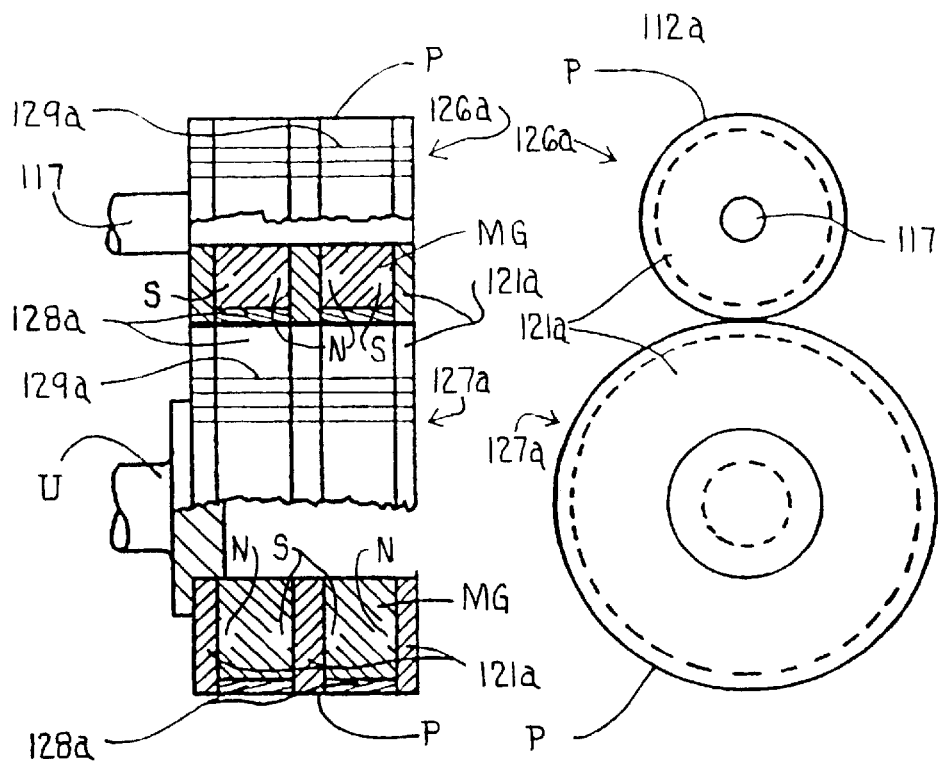
FIG. 20 is another embodiment of the magnetic friction power transmission system.

As shown in FIG. 20, the first main internal magnetized wheel 126a comprises a cylinder consisting of ferromagnetic material which has at least one magnetic wheel 125a having N-pole and S-pole magnets at both sides of the wheel, yokes 121a, 121a disposed at both sides of the wheel and an axle 117 disposed at center of the wheel. A second inner magnetic friction following wheel 127a comprises an inner axle disposed inside the hollow part of the cylinder and the magnetic wheel.

The revolution power is transmitted steadily to an axle 117 mounted at the center of the cylinder by the attraction and repulsion force of alternatively arranged magnetic N-S poles.

A power transmission mechanism of the second main internal magnetized friction wheel 126b and second following magnetized wheel 127b of the magnetic power transmission system will be explained referring to FIG. 21.

Figures 21A, 21B:
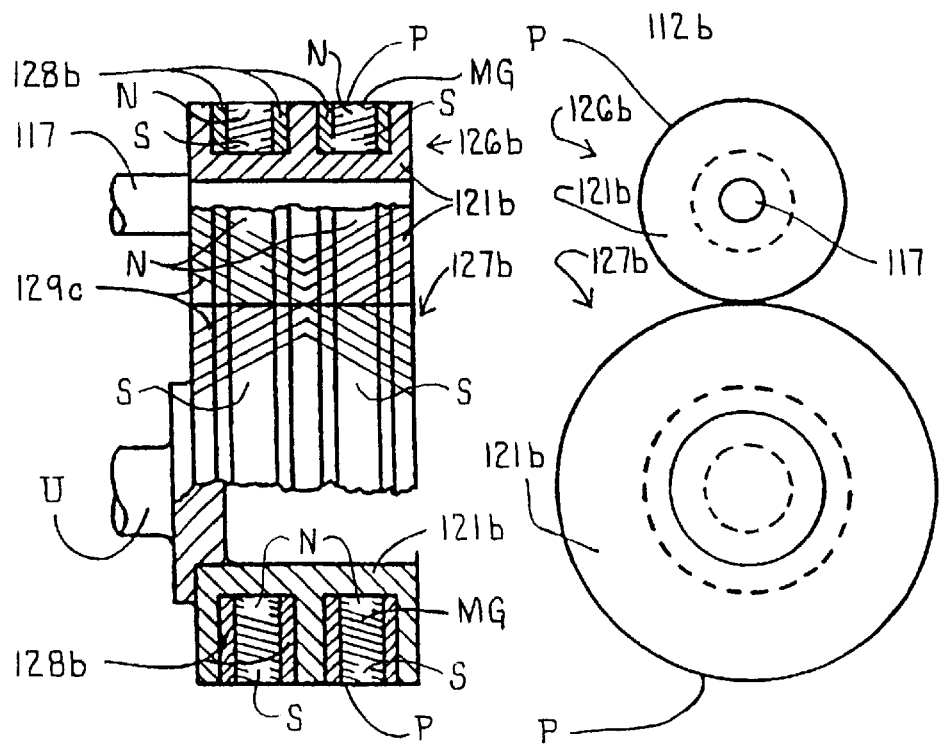
FIG. 21 is another embodiment of the magnetic friction power transmission system.

As shown in FIG. 21, the first main internal magnetized wheel 126b comprises a cylinder consisting of ferromagnetic material which has at least one magnetic wheel 125b having N-pole and S-pole magnets arranged in radius direction of the wheel, yokes 121b, 121b disposed at both sides of the wheel and an axle 117 disposed at center of the wheel. A second inner magnetic friction following wheel 127b comprises an inner axle U disposed inside the hollow part of the cylinder and the magnetic wheel.

The drawbacks of a sliding force toward the radius center will be cancelled by the friction increasing mean 128a and projections 129a. Further, the lubricant of the system can be replaced by the water coolant.

The revolution power is transmitted steadily to an axle 117 mounted at the center of the cylinder by the attraction and repulsion forces of alternatively arranged magnetic N-S poles.

A power transmission mechanism having bevel gear-like construction will be explained referring to FIG. 22.

Figure 22:
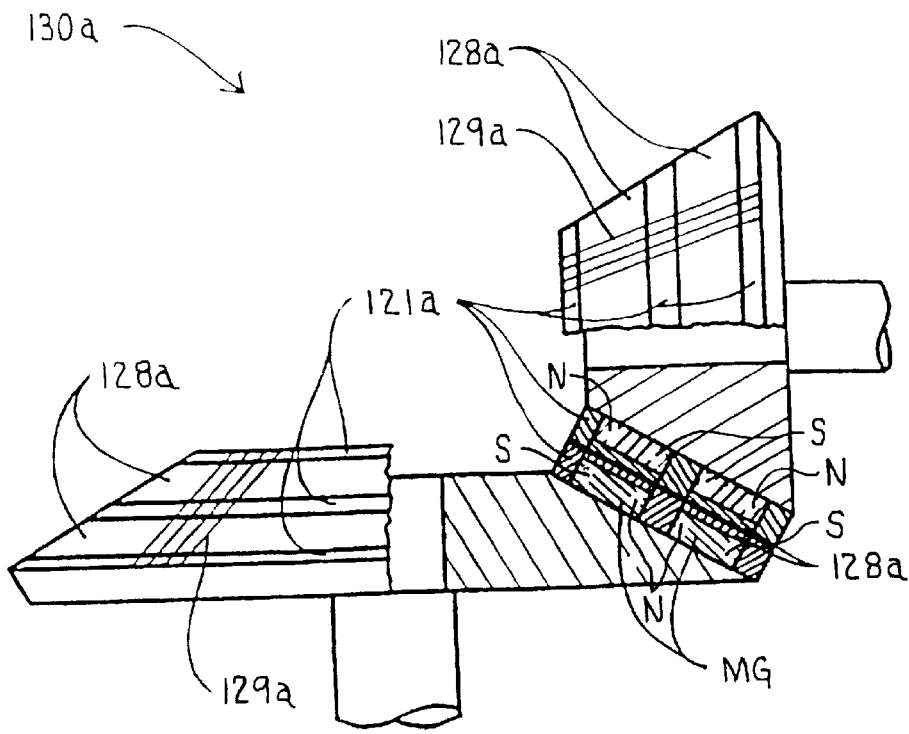
FIG. 22 is an embodiment of the magnetic friction power transmission system in which umbrella type magnetic friction power transmission.

As shown in FIG. 22, a bevel magnetic friction wheel 130a comprises a bevel wheel which has at least one pair of magnetic wheels having N-pole and S-pole magnets.

Revolution power is transmitted steadily by the attraction and repulsion forces of alternatively arranged magnetic N-S poles arranged side by side.

The drawbacks of a sliding force towards the radius center will be cancelled by the friction increasing means 128a and projections 129a. Further, the lubricant of the system can be replaced by the water coolant.

A power transmission mechanism 130b having bevel gear-like construction will be explained referring to FIG. 23.

Figure 23:
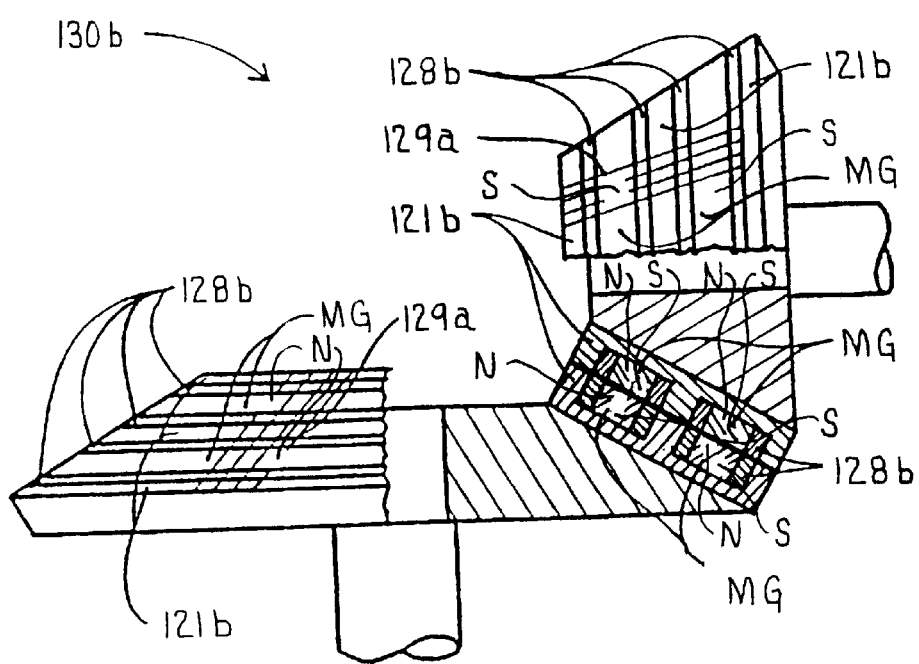
FIG. 23 is an embodiment of an umbrella type magnetic friction power transmission.

As shown in FIG. 23, a bevel magnetic friction wheel comprises a bevel wheel which has at least one pair of magnetic wheels having N-pole and S-pole magnets arranged in a radial direction.

Revolution power is transmitted steadily by the attraction and repulsion forces of alternatively arranged magnetic N-S poles.

The drawbacks of a sliding force towards the radius center will be cancelled by the friction increasing mean 128a and projections 129a. Further, the lubricant of the system can be replaced by the water coolant.

Figure 24:
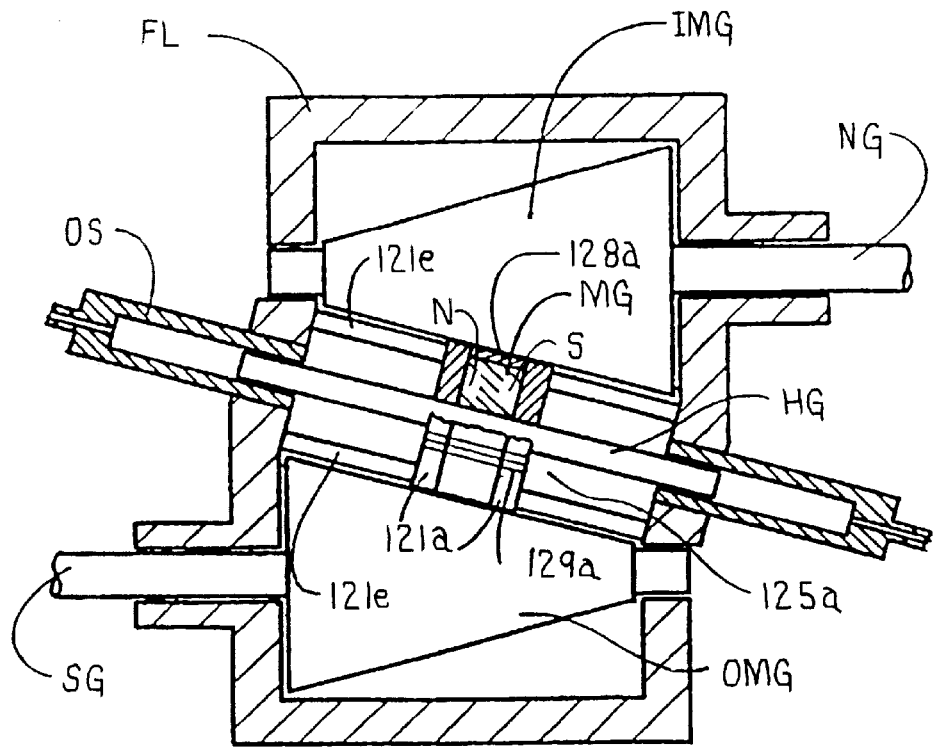

Referring to FIG. 24, a magnetic friction continuously variable transmission with a magnetic friction bevel wheel will be explained.

A shaped input magnetic friction bevel wheel and a conical shape output magnetic friction wheel are rotatably supported in the frame (FL) and the surfaces of the magnetic wheels are covered with proper elastic materials.

The magnetic wheel 125a is obliquely supported by the frame and the magnetic pole section can be slidably moved back and forth with the aid of yokes 121e which are disposed on both sides of the magnetic pole section.

The magnetic pole portion of the magnetic wheel 125a is driven back and forth by a hydraulic cylinder and thereby the output revolution speed is continuously variably changed, since the power transmitting position of the output axle where the diameter of the conical magnetic wheel varies is changed.

Figure 25:
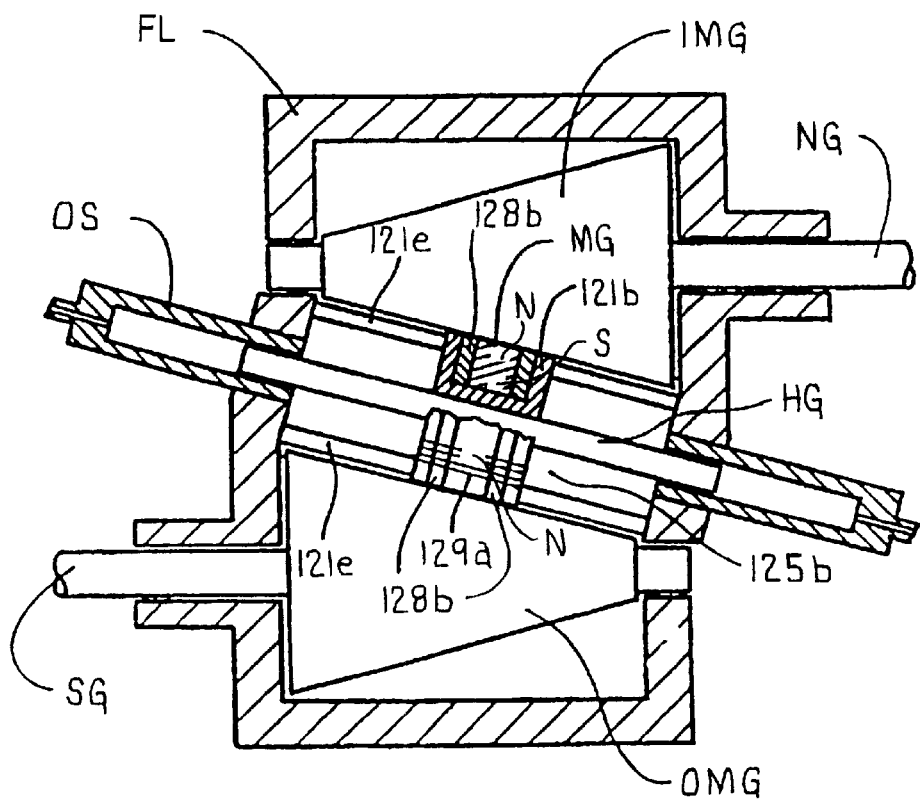
FIG. 25 is a sectional view of a transmission system having a magnetized bevel wheel 125b.

Referring to FIG. 25, another embodiment of the magnetic friction continuously variable transmission with a magnetic friction bevel wheel will be explained.

A magnetic friction bevel wheel 130b comprises a magnetic wheel 125b which has at least one pair of magnetic wheels having N-pole and S-pole magnets.

A conical shape input magnetic friction bevel wheel and a conical shape output magnetic friction wheel are rotatably supported in the frame (FL) and the surfaces of the magnetic wheels covered with proper elastic materials.

The magnetic wheel 125a is obliquely supported by the frame and the magnetic pole section can be slidably moved back and forth with the aid of yokes 121e which are disposed at both sides of the magnetic pole section.

The magnetic pole portion of the magnetic wheel 125a is driven back and forth by a hydraulic cylinder whereby the output revolution speed is continuously variably changed, since the power transmitting position of the output axle where the diameter of the conical magnetic wheel varies is changed.

The revolution power is transmitted steadily by the attraction and repulsion forces of alternatively arranged magnetic N-S poles arranged vertically.

Figure 9:
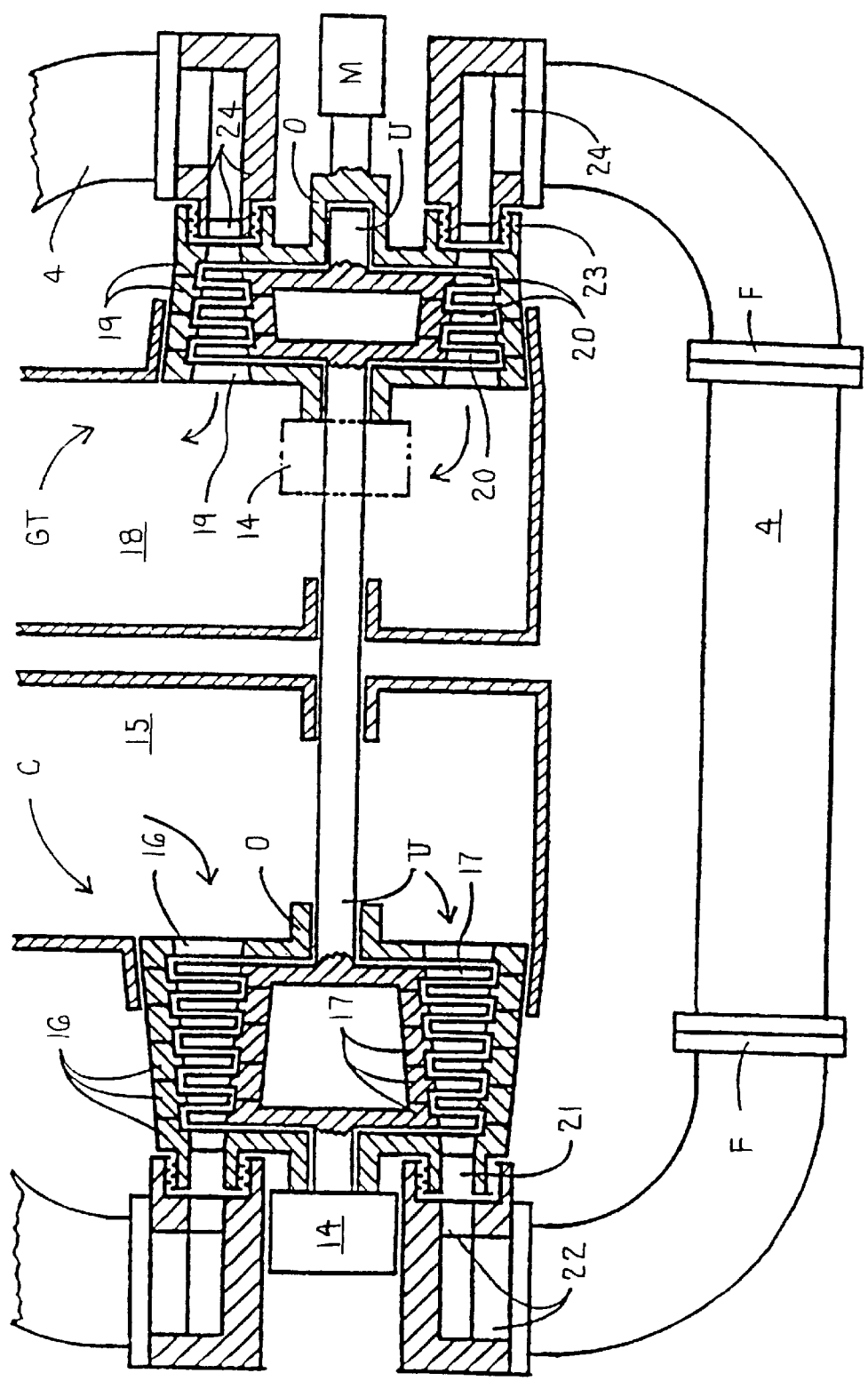
FIG. 9 is a partial sectional view of the second embodiment of this invention.

Referring to FIG. 9, an embodiment of the full rotor combined steam and gas turbine engine will be explained.

As described before, to maximize the thermal efficiency of the gas turbine engine, the operating pressure ratio must be raised, and to raise the operating pressure ratio, the thermal energy supplied to the system should be increased but the operating pressure ratio and the specific power are limited by the heat durability of the turbine system. A problem in increasing the operating pressure ratio and the specific power is that the heat durability temperature limits the full use of the thermal energy generated from the fuel, therefore the combustion gas flow mass should be increased instead of increasing the total thermal energy supplied to the system.

Consequently, if the combustion gas as a working gas of the gas turbine engine, contains a large portion of air, four times as much as the theoretical air to fuel ratio, the dimension of the gas turbine combustion chamber is enlarged long enough to provide the fuel supply means four times as much as the conventional gas turbine, thereby raising the combustion gas temperature, converting the thermal energy into the super-critical steam utilized by the steam turbine and increasing the combustion gas flow mass by four times as much. To achieve the aforementioned goal, the combustion pressure inside the combustion chamber should be increased and the dimension of the combustion chamber should be enlarged and curved. However, the compressor and the turbine are arranged oppositely and arranged high-pressure side outside, low-pressure side outside. Thereby, the combustion chamber is high-pressurized and enlarged. (Usually the combustion chamber is shortened.) (Except in the first and the sixth embodiment, the steam turbine engine is separated from the gas turbine engine.)

Further the system can be assembled and disassembled by providing a plurality of flanges.

More particularly, the first stage outer compressor rotor blades 16, which are annularly disposed around the outer axle rotatably mounted around the inner axle, compress and introduce air from an air intake chamber 15. Second stage inner compressor rotor blades 17 are disposed annularly around the inner axle, and even number stage outer compressor rotor blades 16 are disposed annularly around the outer axle.

Inner compressor odd number stage rotor blades 17 are disposed annularly around the inner axle and also the last stage rotor blades are disposed annularly around the inner axle.

Odd number last stage outer compressor rotor blades 16 are disposed annularly around the outer axle. The outer axle and the inner axle are rotatably mounted and connected with the magnetic friction power transmission system 14 for rotating in an opposite direction at a predetermined revolution speed ratio.

Likewise, last stage outer turbine rotor blades 19 facing an exhaust chamber 18, are annularly disposed around the outer axle, and rotatably mounted around the inner axle. Last stage inner turbine rotor blades 20 are disposed annularly around the inner axle, and even number stage outer turbine rotor blades 19 are disposed annularly around the outer axle.

Inner turbine odd number stage rotor blades 20 are disposed annularly around the inner axle and also the first stage rotor blades are disposed annularly around the inner axle.

Odd number first stage outer turbine rotor blades 19 are disposed annularly around the outer axle. The outer axle is connected to outer loads including power generators.

The outer compressor even number last stage rotor blades has an annular outlet 21 which is connected to an annular shape receiver 22 by an airtight sealing. The outer turbine rotor blades 19 has an annular outlet 23 which is connected to an annular shape jet mouth 24 sealed with an airtight sealant. The jet mouth 24 is connected to the combustion chamber-heat exchanger 4 inside which the water pipes 1 and the steam pipes are installed and through which the super-critical steam is supplied.

The magnetic friction power transmission system disposed outside the compressor may be placed inside the compressor. The turbine may also have a magnetic friction power transmission system 14 indicated with the dotted line in FIG. 9.

Figure 10:
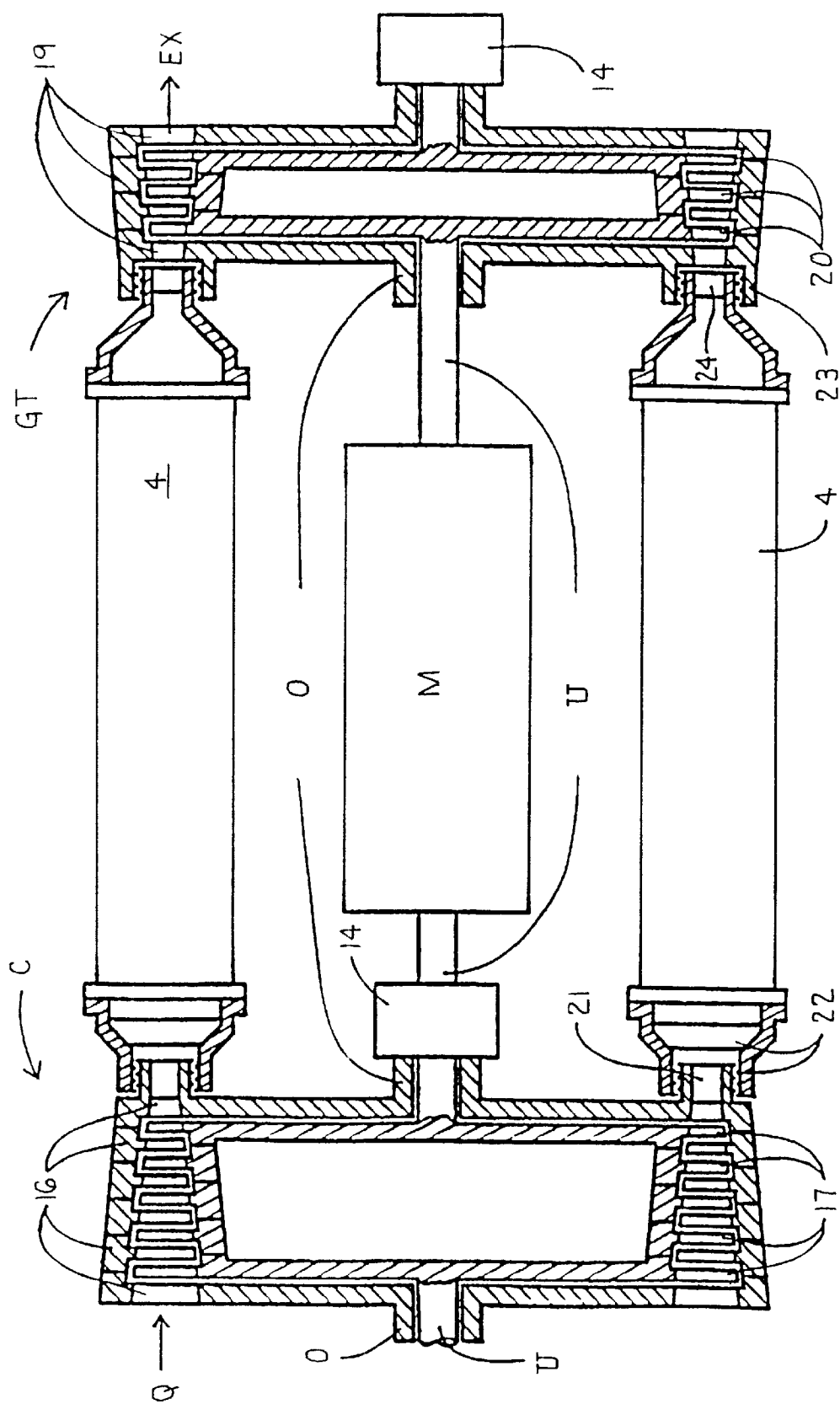
FIG. 10 is a partial sectional view of the third embodiment of this invention.

Referring to FIG. 10, Example 3 of the full rotor blade combined steam and gas turbine engine will be explained.

Basically the construction of the system is similar to the one explained in FIG. 9. Differences are the layout of the units consisting of the system depending on the location and use of the turbine engines. More particularly, a full rotor blade combined steam and gas turbine engine is layout based on a basic concept but an electric power generator is placed between the compressor and the turbine engine. Thereby, the combustion chamber is high-pressurized and enlarged in its length and the combustion chamber is shaped like a straight line.

The compressor, the turbine engine and the electric power generator are arranged depending on power, location and use.

Figure 11:
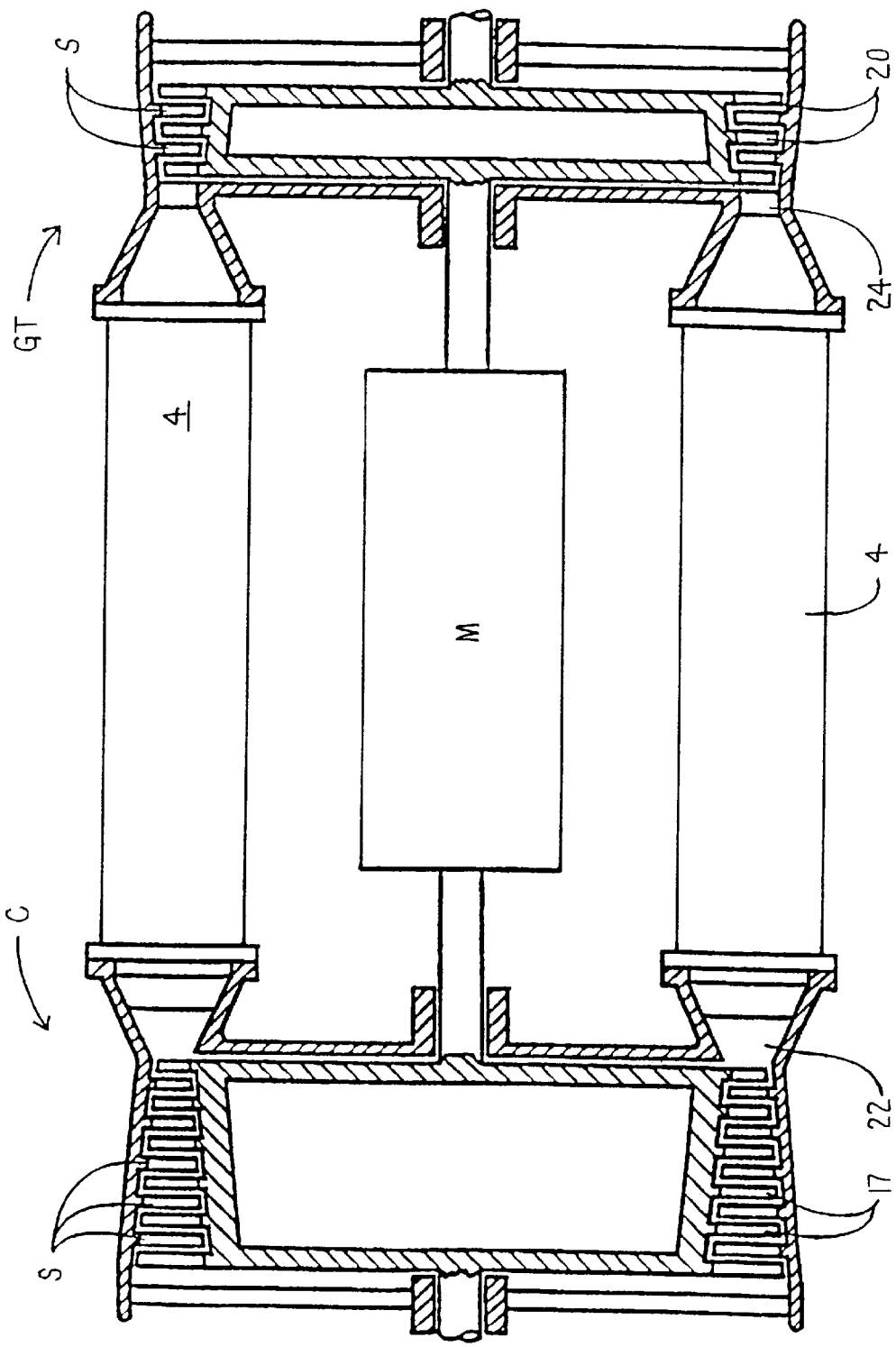
FIG. 11 is a partial sectional view of the fourth embodiment of this invention.

Referring to FIG. 11, Example 4 of the full rotor blade combined steam and gas turbine engine will be explained.

Basically the construction of the system is similar to the one explained in FIG. 10. The difference is that a gas turbine engine of the full rotor blade combined steam and gas turbine engine is replaced by a conventional steam-gas turbine engine.

Figure 12:
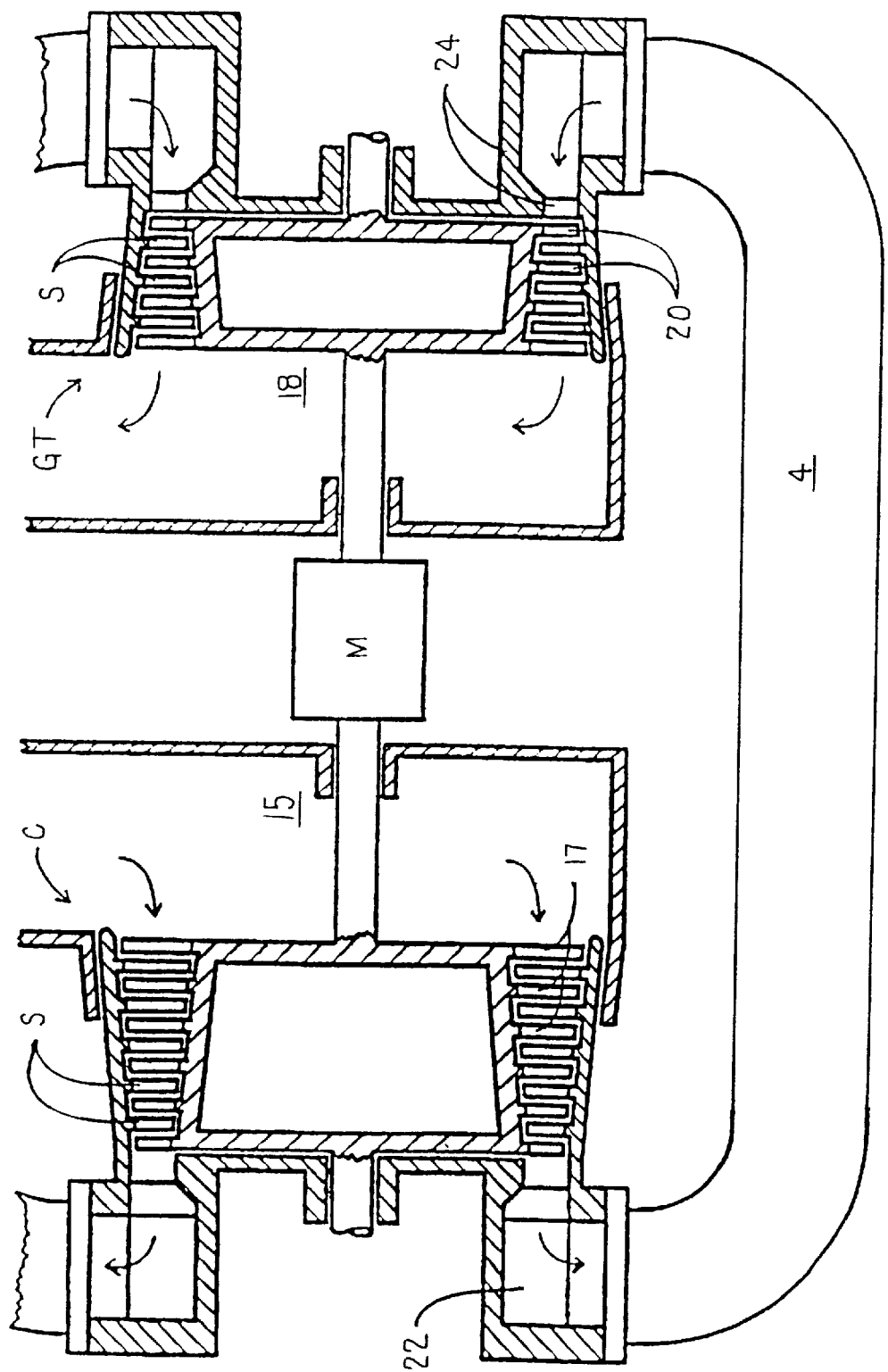
FIG. 12 is a partial sectional view of the fifth embodiment of this invention.

Referring to FIG. 12, Example 5 of the full rotor blade combined steam and gas turbine engine will be explained.

Basically the construction of the system is similar to the one explained in FIG. 9. The difference is that a gas turbine engine of the full rotor blade combined steam and gas turbine engine is replaced by a conventional steam-gas turbine engine.

Figure 13:
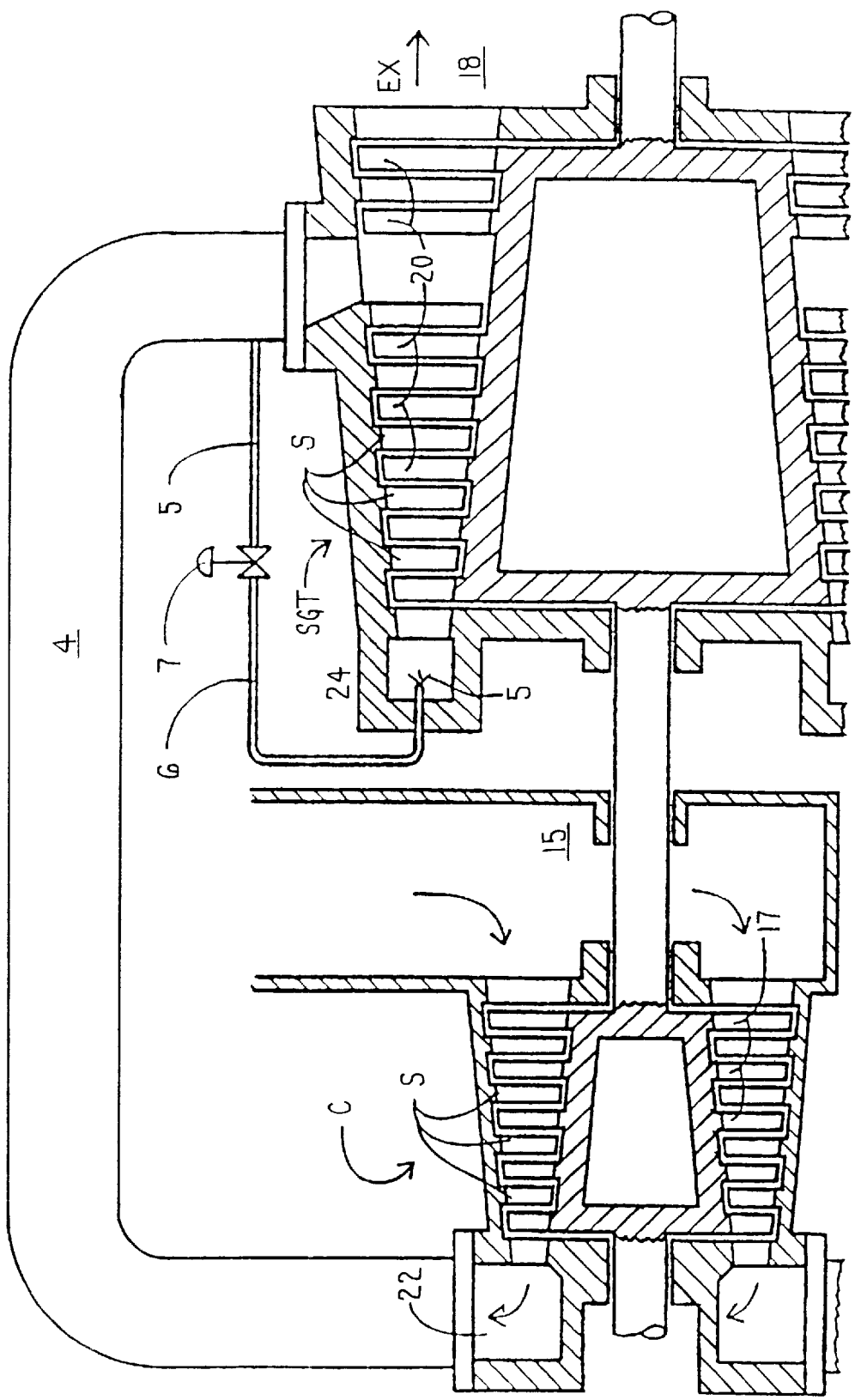
FIG. 13 is a partial sectional view of the sixth embodiment of this invention.

Referring to FIG. 13, Example 6 of the full rotor blade combined steam and gas turbine engine will be explained.

Basically the construction of the system is similar to the one explained in FIG. 6. The difference is that the compressor is reversed and thereby the length of the combustion chamber is enlarged.

Figure 26:
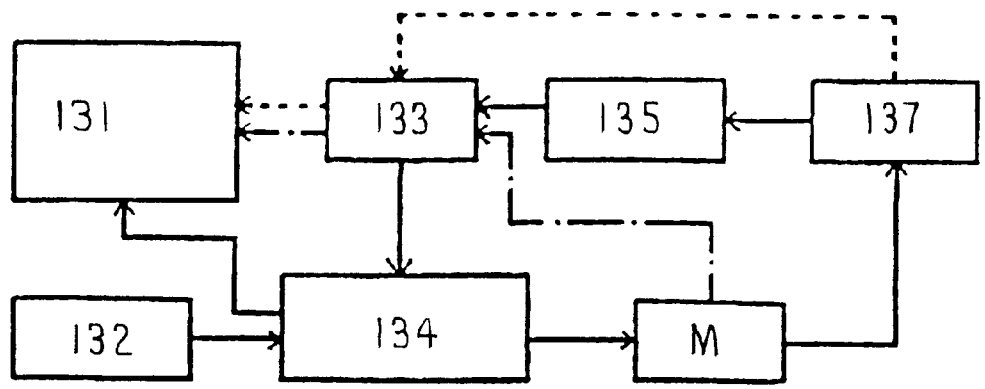
FIG. 26 is a schematic diagram of the combined steam and gas turbine engine.
Figure 27:
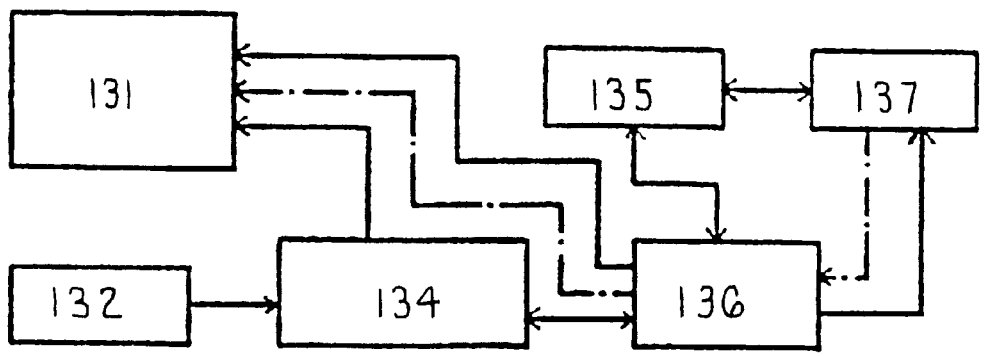
FIG. 27 is a schematic diagram of another embodiment of the combined steam and gas turbine engine.
Figure 28:
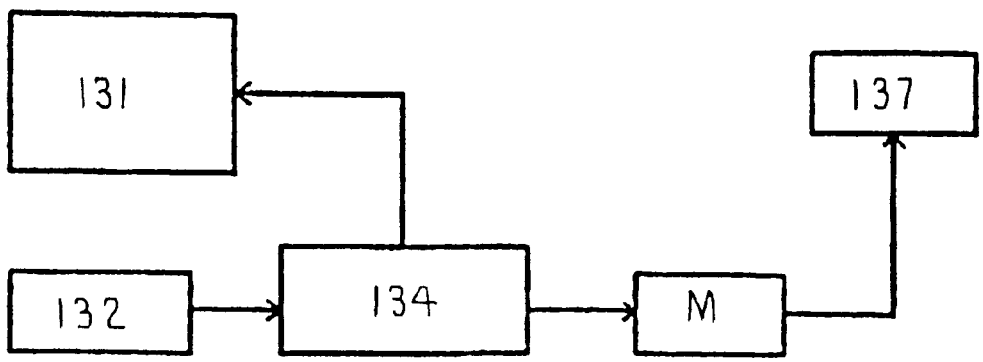
FIG. 28 is a schematic diagram of another embodiment of the combined steam and gas turbine engine.

Referring to FIG. 26, FIG. 27 and FIG. 28, use of the magnetic friction power transmission system will be explained.

In FIG. 26, when applied to a power generation system, the revolution power of the thermal energy engine is properly accelerated by the magnetic friction power transmission system, and an electric power generator is effectively driven or when applied to vehicles, the revolution power is reduced to a proper revolution by the magnetic friction power transmission system for driving the vehicles.

Electricity generated by the electric power generator is then stored in the battery, and the electric power of the battery drives an electric motor directly or via an inverter. The revolution power of the electric motor is transmitted to the axles of the vehicle via the magnetic friction power transmission system and reduction system.

When both the thermal energy engine and the electric motor drive the vehicle, the revolution power is transmitted to the axles of the vehicle via the magnetic friction power transmission system and reduction system.

In other cases, the revolution power of the thermal energy engine is accelerated properly by the magnetic friction power transmission system for driving the electric power generator.

The revolution power is proper reduced to drive a propulsion system of the ship to propel the ship and the electric power is stored in the battery.

When the ship is propelled by the electric power, the electric power is supplied to the electric motor directly or via an inverter system and the revolution power is reduced by the magnet friction power transmission system to drive an auxiliary propulsion system.

When both the thermal energy engine and the electric motor drive the ship, the revolution power is transmitted to the propulsion system of the ship via the magnetic friction power transmission system and reduction system.

In other examples, the revolution power of the thermal energy is used to drive the electric power generator via the magnetic friction power transmission system reducing the revolution speed to the proper speed to drive the electric power generator.

In the example indicated in FIG. 27, the revolution power of the thermal energy engine is properly accelerated to a predetermined revolution speed by the magnetic friction power transmission system for driving the electric motor-generator and the revolution power is reduced to drive the axles of the vehicles. The electric power generated by the electric motor-generator is stored in the battery directly or via the inverter.

An electric car is driven by the electric power stored in the battery which is supplied to the electric motor directly or via the inverter.

When both the thermal energy engine and the electric motor-generator drive the vehicle, the revolution power is transmitted to the axles of the vehicle via the magnetic friction power transmission system and reduction system.

In the example indicated in FIG. 28, the revolution power of the thermal energy engine is properly accelerated to a predetermined revolution speed by the magnetic friction power transmission system for driving the electric generator and the electric power is stored in the battery or the revolution power is reduced to a certain extent to drive the axles of the vehicle.

Also, the revolution power is applied to the ships to propel the ship by accelerating or reducing the revolution power by the magnetic friction power transmission system.

When both the thermal energy engine and the electric motor-generator drive the vehicle, the revolution power is transmitted to the axles of the vehicle via the magnetic friction power transmission system and reduction system.

Proper thermal energy engines for the aforementioned systems are disclosed in Japanese Patent No. 2604636, Japanese Patent Application No. Hei 9-106925, Hei 9-97870.

The systems are applicable to all kinds of vehicles including diesel engine driven cars, trucks, buses, and even motorcycles.

The propulsion systems for ships are screw propellers, air propellers, water jet pumps, Schneider propellers, and nozzle propellers which propel ships by the action of the jet.

APPLICABILITY OF THE INVENTION

The temperature of the exhaust gas is considerably lowered by the low temperature heat recovery heat exchanger by which the exhaust heat loss is lowered and the thermal efficiency of the system is doubled.

The thermal energy from the fuel is effectively changed to the revolution power and the thermal efficiency of the system is increased.

To maximize the operating pressure ratio and utilize the thermal energy of the fuel effectively under the temperature of the heat durability of the system, according to the equation of "thermal efficiency"×"specific power"= "operating pressure ratio"×"combustion gas mass flow", the thermal energy supplied to the turbine engine is minimized to the lowest. Hence, the thermal efficiency and the specific power is increased, especially, the thermal efficiency is doubled.

The heat is effectively converted to super-critical steam, the thermal efficiency of the steam turbine engine also becomes high.

The thermal energy of the exhaust gas having comparatively low thermal energy is recovered through the heat recovery heat exchanger and the exhaust heat loss is recovered. Consequently, the total thermal efficiency of the system is increased.

Super-critical steam is injected into the gas turbine, the steam turbines are omitted from the system, the system becomes compact and the thermal efficiency is increased.

The combined steam and gas turbine engine of this application comprises a gas turbine combustion chamber which has a long dimension and wide heat exchange area used as a heat exchanger, and the thermal energy generated from the fuel is converted to super-critical steam which is used in other systems and increase the operating pressure ratio and the specific power within the heat durability temperature of the system, and the fuel combustion gas mass flow is increased four times as much as the theoretical air to fuel ratio.

The full rotor blade gas turbine engine increases the thermal efficiency of the thermal energy engines.

The magnetic friction power transmission system reduces the mechanical friction losses and the system can be operated without use of a lubricant.

What is claimed is:

1. A combined steam and gas turbine engine comprising a high-pressure, enlarged combustion chamber-heat exchanger having helical water pipes welded therearound for generating supercritical steam and lowering the temperature of the combustion chamber-heat exchanger, a compressor for compressing air and introducing the compressed air into the combustion chamber-heat exchanger, fuel supply means for supplying fuel into the combustion chamber-heat exchanger to be mixed with the compressed air, combusted and form a combustion gas, a steam-gas turbine, means for introducing the supercritical steam and combustion gas into the steam-gas turbine, a magnetic friction power transmission system containing a magnetic wheel comprising a cylinder containing ferromagnetic material having N-pole and S-pole magnets disposed in a radial direction of the magnetic wheel and annular yokes having projections on an inner surface thereof disposed at both sides of the magnetic wheel, and an annular friction increasing means having projections on an inner side thereof and between the yokes so that power is transmitted through the projections provided on the friction increasing means and the yokes through the rotation of the magnetic wheel, the compressor and turbine having concentric axles which are linked through the magnetic friction power transmission system and rotate in opposite directions.

2. The combined steam and gas turbine engine of claim 1, wherein the compressor and the steam-gas turbine are connected by a double reverse magnetic friction power transmission system and all the blades of the system are rotor blades.

3. The combined steam and gas turbine engine of claim 1, wherein the combustion chamber-heat exchanger is curved to enlarge the length thereof and the wall of the combustion chamber-heat exchanger is a welded structure.

4. The combined steam and gas turbine engine of claim 1, wherein an electric power generator is mounted between the turbine and the compressor.

5. The combined steam and gas turbine engine of claim 1, wherein a plurality of fuel supply means are disposed in each combustion chamber.

6. The combined steam and gas turbine engine of claim 1, wherein a heat recovery system for recovering the heat from the exhaust gas is disposed downstream of the steam-gas turbine.

7. The combined steam and gas turbine engine of claim 6, wherein condensed water is returned to the heat recovery system by a return pump, heated by the heat recovery system, and supplied to the water pipes of the combustion chamber-heat exchanger.

8. The combined steam and gas turbine engine of claim 1, wherein water is supplied to the combustion chamber-heat exchanger, converted to super critical steam and supplied to the steam-gas turbine as a working fluid.

9. The combined steam and gas turbine engine of claim 1, wherein the water pipes are disposed helically inside an outer wall of the combustion chamber-heat exchanger.

10. The combined steam and gas turbine engine of claim 1, wherein at least one magnet which attracts a magnet having an opposite magnet pole, is disposed at the position of the yokes or outside of the yokes.

11. The combined steam and gas turbine engine of claim 1, wherein at least one magnet which repels a magnet having a same magnet pole, is disposed at the position of the yokes or outside of the yokes.

12. The combined steam and gas turbine engine of claim 1, wherein at least one pair of magnets of the magnetic wheel are disposed face to face.

13. The combined steam and gas turbine engine of claim 1, wherein at least two magnets of the magnetic wheel are disposed face to face and the magnet wheel is connected with an inner axle of the compressor.

14. The combined steam and gas turbine engine of claim 1, wherein the magnetic friction power transmission system additionally comprises water cooling means.

15. The combined steam and gas turbine engine of claim 1, wherein the projections of the friction increasing means are selected from normal projections, helical projections, and herringbone projections.

* * * * *